(12) United States Patent
Allen-Ware et al.

(10) Patent No.: US 9,329,670 B2
(45) Date of Patent: May 3, 2016

(54) PREDICTING ENERGY SAVINGS

(75) Inventors: Malcolm S. Allen-Ware, Austin, TX (US); Wei Huang, Austin, TX (US); Fadi M. Kassem, Austin, TX (US); Karthick Rajamani, Austin, TX (US); Todd J. Rosedahl, Zumbrota, MN (US); Guillermo J. Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 13/488,822

(22) Filed: Jun. 5, 2012

(65) Prior Publication Data

US 2013/0325378 A1 Dec. 5, 2013

(51) Int. Cl.
G01F 1/32 (2006.01)
G06F 1/32 (2006.01)

(52) U.S. Cl.
CPC ...................................... *G06F 1/329* (2013.01)

(58) Field of Classification Search
CPC .. G06F 1/329; G06F 17/5022; G06F 2217/78
See application file for complete search history.

(56) References Cited

U.S. PATENT DOCUMENTS

| | | | |
|---|---|---|---|
| 6,390,379 B1 | 5/2002 | Huang | |
| 6,643,128 B2 | 11/2003 | Chu et al. | |
| 6,959,258 B2 | 10/2005 | Smith et al. | |
| 7,167,015 B2 | 1/2007 | Borkar | |
| 7,281,140 B2 | 10/2007 | Burns et al. | |
| 7,321,942 B2 | 1/2008 | Flautner et al. | |
| 7,424,806 B2 | 9/2008 | Tien et al. | |
| 7,430,672 B2 | 9/2008 | Rotem et al. | |
| 7,487,371 B2 | 2/2009 | Simeral et al. | |
| 7,533,003 B2 | 5/2009 | Floyd et al. | |
| 7,644,051 B1 | 1/2010 | Moore et al. | |
| 7,689,839 B2 | 3/2010 | Uguen et al. | |
| 7,840,825 B2 | 11/2010 | Altevogt et al. | |
| 7,904,287 B2 | 3/2011 | Lefurgy et al. | |

(Continued)

FOREIGN PATENT DOCUMENTS

WO WO2005/017468 A2 2/2005

OTHER PUBLICATIONS

Response to Office Action filed Aug. 27, 2012, U.S. Appl. No. 12/726,792, 11 pages.

(Continued)

*Primary Examiner* — Mischita Henson
(74) *Attorney, Agent, or Firm* — Francis Lammes; Stephen J. Walder, Jr.; William J. Stock

(57) ABSTRACT

A mechanism is provided for estimating energy/power consumption of a fixed-frequency operating mode while system is running in dynamic power management mode. For each time interval in a plurality of time intervals within a time period: a first processor identifies a modeled total nominal power value for at least one second processor during a current time interval, stores the modeled total nominal power value for the current time interval in a storage, identifies a dynamic power management mode power value for the at least one second processor in the data processing system during the current interval, and stores the dynamic power management mode power value for the current time interval in the storage. Responsive to the time period expiring, a comparison is produced of a plurality of modeled total nominal power values and a plurality of dynamic power management mode power values over the time period.

18 Claims, 10 Drawing Sheets

(56) References Cited

U.S. PATENT DOCUMENTS

| | | | |
|---|---|---|---|
| 7,917,772 | B1 | 3/2011 | Koniaris et al. |
| 7,971,073 | B2 | 6/2011 | Hsu et al. |
| 8,041,521 | B2 | 10/2011 | Bletsch et al. |
| 8,214,663 | B2 | 7/2012 | Floyd et al. |
| 8,266,569 | B2 | 9/2012 | Palisetti et al. |
| 8,332,074 | B2 | 12/2012 | Lee |
| 8,412,479 | B2 | 4/2013 | David et al. |
| 8,532,826 | B2 | 9/2013 | Moss et al. |
| 8,671,290 | B2 | 3/2014 | Hsu |
| 2004/0206101 | A1 | 10/2004 | Bash et al. |
| 2004/0236560 | A1* | 11/2004 | Chen .............................. 703/18 |
| 2005/0273208 | A1 | 12/2005 | Yazawa et al. |
| 2006/0052970 | A1 | 3/2006 | Arabi et al. |
| 2006/0090086 | A1 | 4/2006 | Rotem et al. |
| 2006/0168571 | A1 | 7/2006 | Ghiasi et al. |
| 2006/0178764 | A1 | 8/2006 | Bieswanger et al. |
| 2008/0234953 | A1 | 9/2008 | Ignowski et al. |
| 2008/0278905 | A1 | 11/2008 | Artman et al. |
| 2009/0138219 | A1 | 5/2009 | Bletsch et al. |
| 2009/0259869 | A1 | 10/2009 | Naffziger |
| 2009/0296342 | A1 | 12/2009 | Matteson et al. |
| 2010/0049995 | A1 | 2/2010 | Casey et al. |
| 2010/0218029 | A1 | 8/2010 | Floyd et al. |
| 2010/0268930 | A1 | 10/2010 | Bose et al. |
| 2010/0268974 | A1 | 10/2010 | Floyd et al. |
| 2010/0268975 | A1 | 10/2010 | Bose et al. |
| 2011/0231030 | A1 | 9/2011 | Carter et al. |

OTHER PUBLICATIONS

U.S. Appl. No. 13/288,346.
U.S. Appl. No. 13/079,842.
U.S. Appl. No. 12/424,158.
U.S. Appl. No. 12/424,161.
U.S. Appl. No. 12/726,792.
U.S. Appl. No. 12/749,179.
"Use of Instrumented Activity Counts to Identify Relevant Code Points for Performance Analysis and Tuning", www.IP.com No. IPCOM000184039D, Jun. 9, 2009, 7 pages.
Economou, Dimitris et al., "Full-System Power Analysis and Modeling for Server Environments", Stanford University, Workshop on Modeling Benchmarking and Simulation, 2006, 8 pages.
Jacobson, Hans et al., "Abstraction and Microarchitecture Scaling in Early-Stage Power Modeling", IEEE, 2011, pp. 394-405.
Joseph, Russ et al., "Run-time Power Estimation in High-Performance Microprocessors", Proceedings of the International Symposium on Low Power Electronics and Design (ISLPED), Aug. 6-7, 2002, 6 pages.
Lee, Seung Eun et al., "A variable frequency link for a power-aware network-on-chip (NoC)", Integration, The VLSI Journal, v. 42, Jan. 2009, pp. 479-485.
Pakbaznia, Ehsan et al., "Minimizing Data Center Cooling and Server Power Costs", Proceedings of the 14th ACM/IEEE International Symposium on Low Power Electronics and Design, 2009, pp. 145-150.
Powell, Michael D. et al., "CAMP: A Technique to Estimate Per-Structure Power at Run-time using a Few Simple Parameters", IEEE, 2008, pp. 289-300.
Shin, Donghwa et al., "Energy-Optimal Dynamic Thermal Management for Green Computing", ACM, ICCAD '09, Nov. 2-5, 2009, 6 pages.
Snowden, David, "Operating System Directed Power Management", Thesis, School of Computer Science and Engineering at The University of New South Wales, Mar. 4, 2010, 237 pages.
Wang, Zhikui et al., "Optimal Fan Speed Control for Thermal Management of Servers", Proceedings of the ASME/Pacific Rim Technical Conference and Exhibition on Packaging and Integration of Electronic and Photonic Systems, MEMS, and NEMS InterPACK'09, San Francisco, California, Jul. 19-23, 2009, 11 pages.
Zhang, Lide et al., "Process Variation Characterization of Chip-Level Multiprocessors", 2009 46th ACM/IEEE Design Automation Conference (DAC), 2009, pp. 694-697.
U.S. Appl. No. 13/608,285.
Interview Summary mailed Sep. 5, 2013 from the USPTO for U.S. Appl. No. 13/079,842; 3 pages.
Notice of Allowance mailed from the USPTO Sep. 12, 2013 for U.S. Appl. No. 13/079,842; 9 pages.
Office Action dated Jun. 25, 2013 for U.S. Appl. No. 13/079,842; 16 pages.
Response to Office Action dated Sep. 3, 2013, U.S. Appl. No. 13/079,842, 12 pages.
International Search Report and Written Opinion dated Jan. 25, 2013 for International Application No. PCT/US2012/062919, 12 pages.
Notice of Allowance mailed Feb. 7, 2013 for U.S. Appl. No. 12/726,792; 12 pages.

* cited by examiner

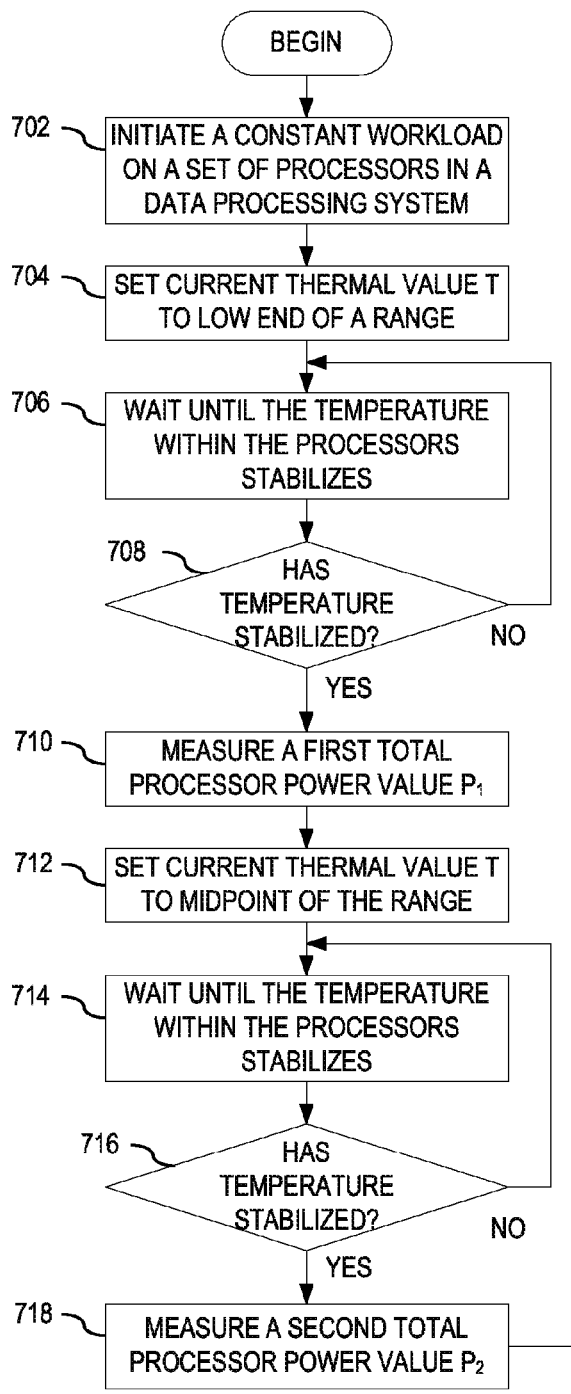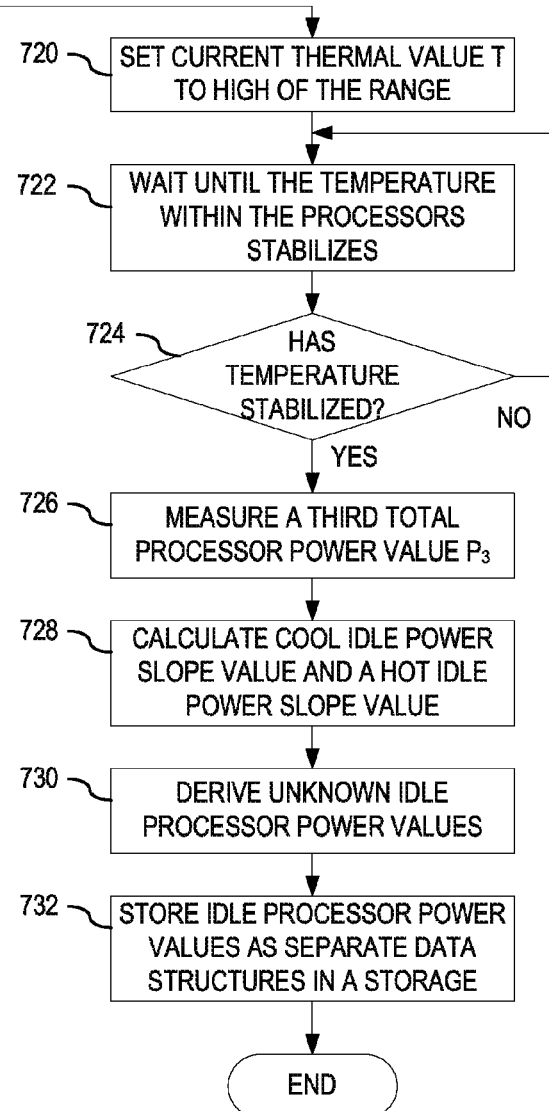
FIG. 7

PREDICTING ENERGY SAVINGS

BACKGROUND

The present application relates generally to an improved data processing apparatus and method and more specifically to mechanisms for predicting energy savings.

As computer and other electronic systems have increased performance over time, the power consumed to enable the performance has increased dramatically. Performance optimization has long been the goal of different architectural and systems software studies, driving technological innovations to the limits for getting the most out of every cycle. This quest for performance has made it possible to incorporate millions of transistors on a very small die, and to clock these transistors at very high speeds. While these innovations and trends have helped provide tremendous performance improvements over the years, they have at the same time created new problems that demand immediate consideration.

SUMMARY

In one illustrative embodiment, a method, in a data processing system, is provided for estimating energy/power consumption of a fixed-frequency operating mode while system is running in dynamic power management mode. For each time interval in a plurality of time intervals within a time period the illustrative embodiment identifies a modeled total nominal power value for at least one processor in the data processing system during a current time interval, stores the modeled total nominal power value for the current time interval in a storage, identifies a dynamic power management mode power value for the at least one processor in the data processing system during the current interval; and store the dynamic power management mode power value for the current time interval in the storage. In the illustrative embodiments, for the plurality of time intervals, a plurality of modeled total nominal power values and a plurality of dynamic power management mode power values are stored. Then, responsive to the time period expiring, the illustrative embodiment produces a comparison of the plurality of modeled total nominal power values and the plurality of dynamic power management mode power values over the time intervals in the plurality of time intervals in the time period.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts a flowchart outlining exemplary operations for deriving an idle processor power, either characterized or shipped, in accordance with an illustrative embodiment;

DETAILED DESCRIPTION

Currently, there is no means for a customer to understand cost savings from a dynamic power management policy operation over a traditional fixed-frequency operation without running workloads in both modes, measuring the power, and manually computing the savings. Therefore, the illustrative embodiments provide a mechanism for predicting energy savings over a nominal fixed-frequency power management mode using run-time measurements under a variable-frequency dynamic-power management policy mode. In the illustrative embodiments, system characterization with benchmark workloads is performed to extract a model of different power components' relationship with activities, temperature, and idle power. At run time, in the variable-frequency power saving mode, the model is used to calculate total system power at fixed nominal frequency, which is then subtracted from actual power measurement to find power savings at each moment. The savings may then be integrated over time to calculate a total energy saving of power-saving mode.

Figure 1:
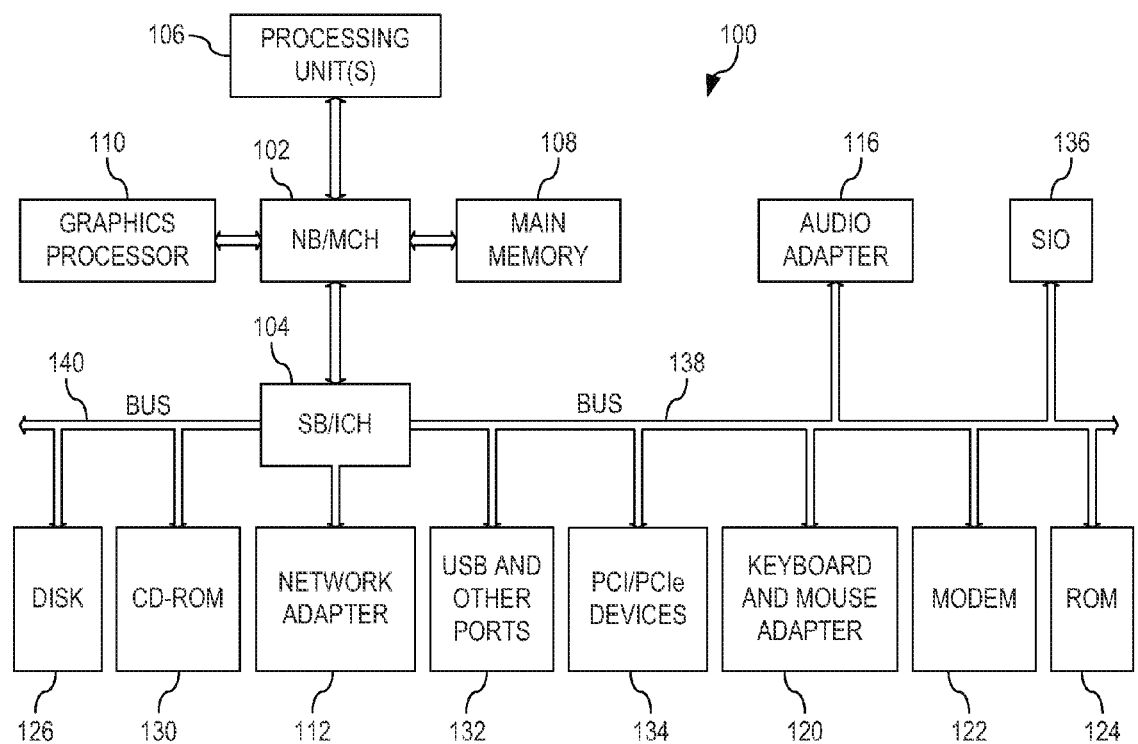
FIG. 1 is a block diagram of an example data processing system in which aspects of the illustrative embodiments may be implemented.
Figure 2:
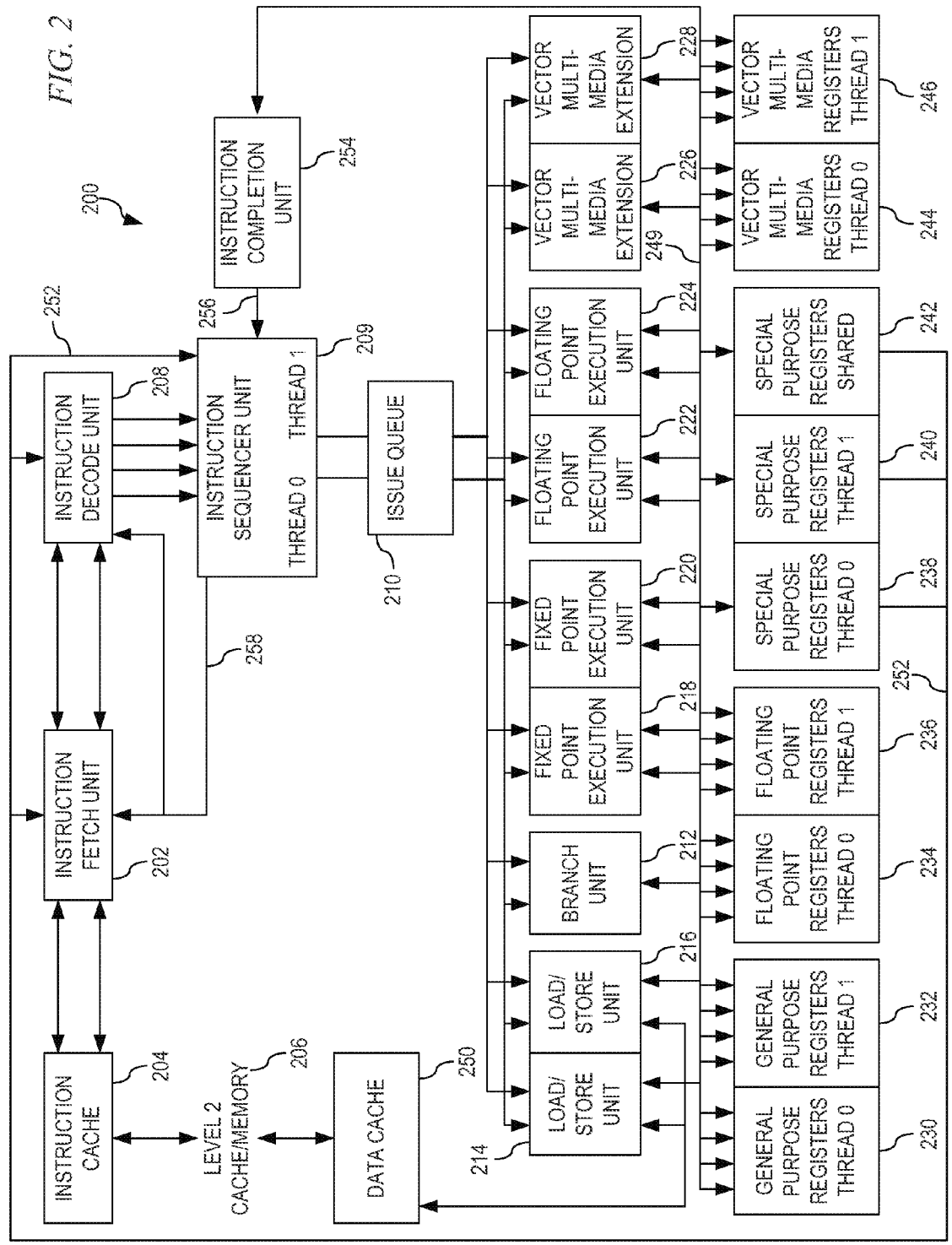
FIG. 2 depicts an exemplary block diagram of a conventional dual threaded processor design showing functional units and registers in accordance with an illustrative embodiment.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located. In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 100.

As a server, data processing system 100 may be, for example, an IBM® eServer™ System p® computer system, running the Advanced Interactive Executive (AIX®) operating system or the LINUX® operating system. Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Referring to FIG. 2, an exemplary block diagram of a conventional dual threaded processor design showing functional units and registers is depicted in accordance with an illustrative embodiment. Processor 200 may be implemented as processing unit 106 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 3:
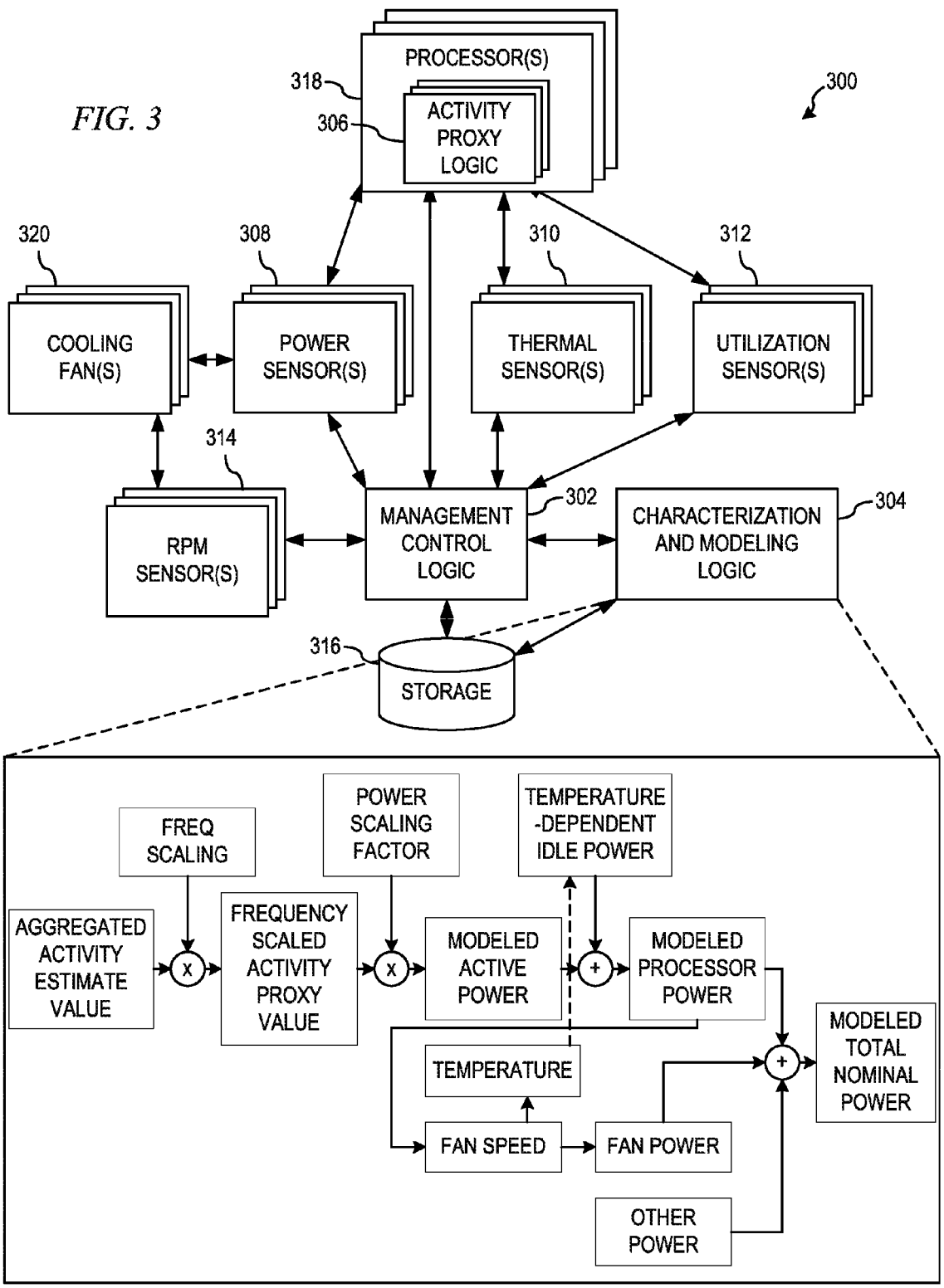
FIG. 3 depicts a high-level view of fixed-frequency characterization and modeling to estimate energy/power consumption of a fixed-frequency operating mode while system is running in dynamic power management mode in accordance with an illustrative embodiment.

FIG. 3 depicts a high-level view of fixed-frequency characterization and modeling to estimate energy/power consumption of a fixed-frequency operating mode while system is running in dynamic power management mode in accordance with an illustrative embodiment. Data processing system 300 comprises management control logic 302 and characterization and modeling logic 304. In order to obtain characterization data and real-time data for each of processors 318 in data processing system 300, management control logic 302 interacts with activity proxy logic 306, power sensor(s) 308, thermal sensor(s) 310, utilization sensor(s) 312, revolution per minute (RPM) sensor(s) 314, or the like.

Power sensors 308 monitor the power consumed by each of the processors and each of cooling fans 320 and send the detected system aggregated activity estimate values to management control logic 302. Likewise, utilization sensors 312 may monitor the workload performed by each of processors 318 and send detected utilization values to management control logic 302. Similarly, thermal sensors 310 may be positioned adjacent to areas within data processing system 300 that typically experience the greatest variance in temperature during the execution of most applications, such as adjacent to each of processors 318. Thermal sensors 310 monitor the temperature associated with these areas and send the detected temperature values to management control logic 302. Additionally, thermal sensors 310 may be directed to measuring both an ambient temperature of data processing system 300 as well as extreme localized temperature areas of data processing system 300, such as those used in the illustrative embodiments, which may comprise: adjacent to each processing unit, memory flow controller, disks, or the like. RPM sensors 314 may monitor the revolutions per minute (RPMs) of cooling fans 320 and send detected RPM values to management control logic 302.

At a high level, characterization and modeling logic 304 receives real-time aggregated activity estimate values for each processor within data processing system 300 via management control logic 302 and activity proxy logic 306 that indicate that power being used by each processor in executing activities of a workload. For each processor, characterization and modeling logic 304 multiples the aggregated activity estimate value with a frequency scaling factor, which calculated by dividing a real-time measured frequency value divided by a specified fixed-frequency value. The specified fixed-frequency value is a frequency value of a desired fixed-frequency mode specified by a user of data processing system 300 in order to determine a difference between the fixed-frequency mode and a current operating mode of data processing system 300. By characterization and modeling logic 304 multiplying with the aggregated activity estimate value with the frequency scaling factor, characterization and modeling logic 304 obtains a frequency-scaled activity proxy counter value which is indicative of the activities being executed by the processors within data processing system 300 as a value of the specified fixed-frequency value.

Using vital processor data that is provided by the manufacturer and/or calculated at deployment time of data processing system 300 and stored in storage 316, characterization and modeling logic 304 determines a slope of for the processor as shipped (slope_shipped) and utilizes this value as a power scaling factor. Characterization and modeling logic 304 multiplies power scaling factor with the frequency-scaled activity proxy counter value to obtain a modeled active power value. Based on a current operating temperature of data processing system 300 obtained via management control logic 302 from temperature sensors 310, characterization and modeling logic 304 identifies a shipped temperature dependent idle power value from a data structure of temperature dependent idle processor power values stored in storage 316. As will be described in detail below, the data structure of temperature dependent idle processor power values is generated by management control logic 302 during an initialization phase of data processing system 300 when no workload is being executed.

Characterization and modeling logic 304 adds the identified temperature dependent idle processor power value to the modeled active power value to obtain a modeled processor power value. In order to obtain a modeled total nominal power value for data processing system 300 during the current time interval, characterization and modeling logic 304 adds the modeled processor power value for each processor in data processing system 300, a measured fan power value for the current time interval (described in detail below), as well as other measured power values associated with power consuming devices in data processing system 300, such as memory device power, input/output (I/O) device power, service processor power, or the like. Characterization and modeling logic 304 stores the modeled total nominal power value for the current interval in storage 316.

In order to provide a comparison of determined modeled total nominal power values in relation to the dynamic power management mode value, for each time interval, management control logic 302 determines a dynamic power management mode power value, which management control logic 302 also stores in storage 316 associated with the modeled processor power value of the same time interval. In order to determine dynamic power management mode power value, management control logic 302 implements logic in a final power model that provides run-time fixed-frequency power estimation in the dynamic power saving mode.

For each subsequent time interval, characterization and modeling logic 304 again determines a new modeled total nominal power value and management control logic 302 determines a dynamic power management mode power value. During each subsequent operation, the temperature of data processing system 300 will rise and fall with the work being performed which not only effects the temperature dependent idle power value but all the fan power value as the fan speed will change with the temperature change. Thus, characterization and modeling logic 304 stores the modeled total nominal power value for the current interval in storage 316 and management control logic 302 stores the determined dynamic power management mode power value in storage 316 associated with the modeled processor power value of the same time interval.

Finally, once characterization and modeling logic 304 stores a plurality of modeled total nominal power values and management control logic 302 stores a plurality of dynamic power management mode power values for a specified time period, characterization and modeling logic 304 and/or management control logic 302 may provide a comparison of the plurality of modeled total nominal power values and the plurality of dynamic power management mode power values to the user such as through a graphical representation, a numerical representation, or the like.

Figure 4:
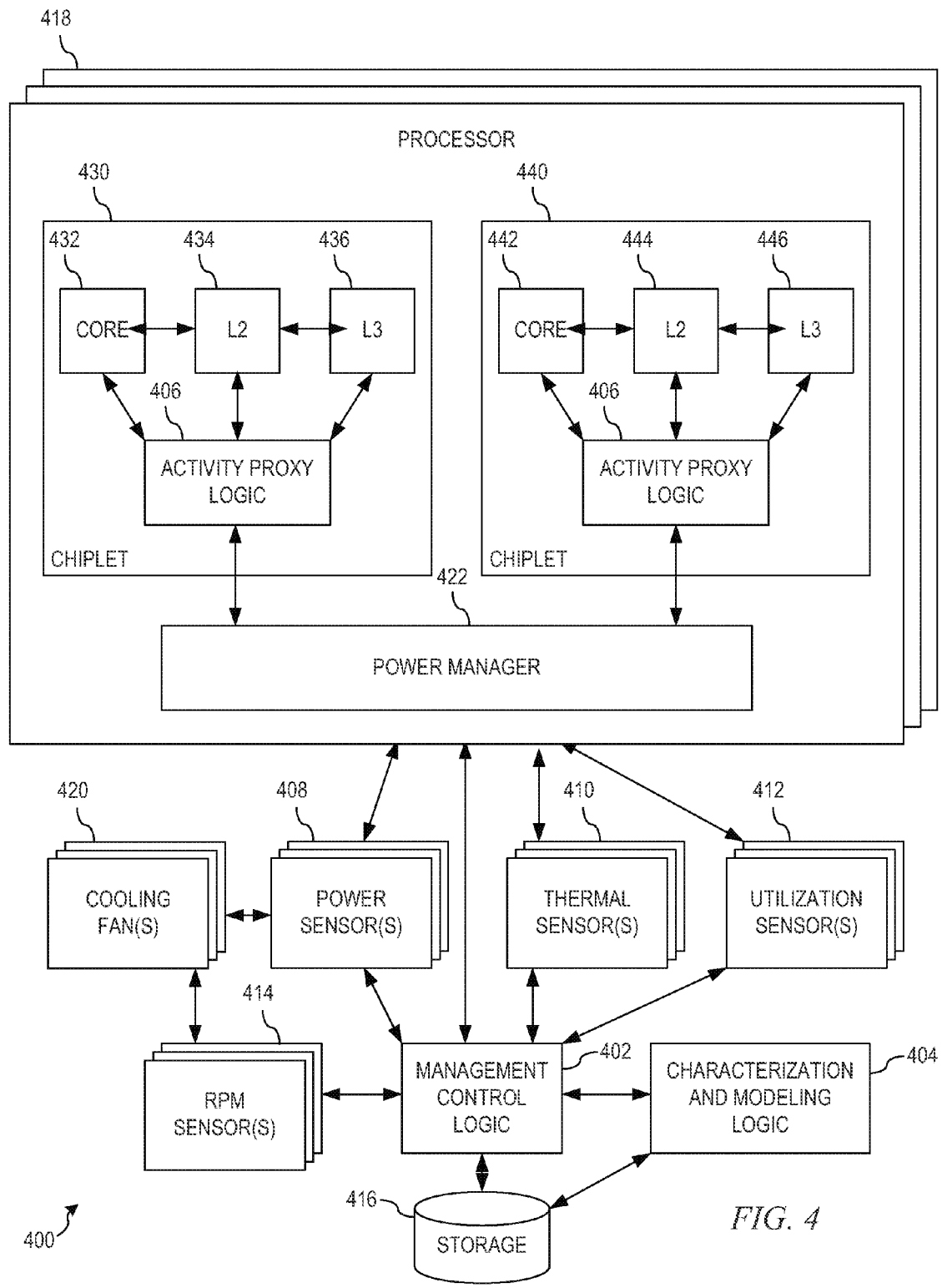
FIG. 4 depicts a detailed view of fixed-frequency characterization and modeling to estimate energy/power consumption of a fixed-frequency operating mode while system is running in dynamic power management mode in accordance with an illustrative embodiment.

FIG. 4 depicts a detailed view of fixed-frequency characterization and modeling to estimate energy/power consumption of a fixed-frequency operating mode while system is running in dynamic power management mode in accordance with an illustrative embodiment. Data processing system 400, which is similar to data processing 300 of FIG. 3, comprises management control logic 402 and characterization and modeling logic 404. In order to obtain characterization data and real-time data for each processor in data processing system 400, management control logic 402 interacts with activity proxy logic 406, power sensor(s) 408, thermal sensor(s) 410, utilization sensor(s) 412, revolution per minute (RPM) sensor(s) 414, or the like.

Power sensors 408 monitor the power consumed by each of the processors and each of cooling fans 420 and send the detected system aggregated activity estimate values to management control logic 402. Likewise, utilization sensors 412 may monitor the workload performed by each of processors 418 and send detected utilization values to management control logic 402. Similarly, thermal sensors 410 may be positioned adjacent to areas within data processing system 400 that typically experience the greatest variance in temperature during the execution of most applications, such as adjacent to each of processors 418. Thermal sensors 410 monitor the temperature associated with these areas and send the detected temperature values to management control logic 402. Additionally, thermal sensors 410 may be directed to measuring both an ambient temperature of data processing system 400 as well as extreme localized temperature areas of data processing system 400, such as those used in the illustrative embodiments, which may comprise: adjacent to each processing unit, memory flow controller, disks, or the like. RPM sensors 414 may monitor the revolutions per minute (RPMs) of cooling fans 420 and send detected RPM values to management control logic 402.

In order to obtain the real-time aggregated activity estimate values for each processor within data processing system 400, during the execution of applications or software on data processing system 400, management control logic 402 monitors various conditions associated with a set of components on each of processors 418. Each of processors 418 comprises power manager 422 and chiplets 430 and 440. A chiplet is a processor core plus some memory cache, such as an L2, L3, or L4 memory cache, or some combination thereof. Chiplet 430 comprises core 432, L2 cache 434, L3 cache 436, and activity proxy logic 406. Chiplet 440 comprises core 442, L2 cache 444, L3 cache 446, and activity proxy logic 406. While FIG. 4 illustrates processors 418 as comprising two (2) chiplets and two levels of memory cache, alternate illustrative embodiments contemplate processors 418 as comprising any number of chiplets and memory caches, from one to several.

In some illustrative embodiments, activity proxy logic 406 track activity metrics on a per-chiplet basis, while in other illustrative embodiments, activity proxy logic 406 track the metrics on a per thread basis. Activity counters within each of activity proxy logic 406 track activities in cores 432 and 442, L2 cache 434 and 444, and L3 cache 436 and 446, respectively, and reset on activity read from the activity proxy logic. Each of activity proxy logic 406 counts each of these activities in a counter. Activity proxy logic 406 multiplies the individual counts by a dynamically set weight factor specific to that particular activity to reach a value and store the value in an activity counter. A description of how the various weights associated with the various activity counters are dynamically determined and set will be described in detail below. A weight may be any value other than zero. In an illustrative embodiment, the weight factor comprises four bits. In other illustrative embodiments, the weight factor may be comprised of any number of bits.

Activity proxy logic 406 monitors a set of counters. Whenever an activity specified to be monitored occurs, activity proxy logic 406 adds a value equal to a dynamically set weight associated with the activity to a counter. The counter is associated with one activity only. Then, periodically, the values held in the set of counters monitored by activity proxy logic 406 are collected by activity proxy logic 406. Activity proxy logic 406 each add these collected values together to arrive at an aggregated activity estimate value for the unit monitored by each of activity proxy logic 406. Activity proxy logic 406 sends these aggregated activity estimate values to power manager 422 and then onto management control logic 402.

Each of activity proxy logic 406 manages a set of counters. The activity proxy logic collects the stored values for the set of counters the activity proxy logic manages in parallel. Further, a single power manager manages a set of activity proxy logic. Each activity proxy has one or more units assigned that the activity proxy logic monitors. The activity proxy logic may then collect values in parallel or independently of each other. Further, the collection period is configurable for each activity proxy logic, and each activity proxy logic may collect the stored values for different periods than every other activity proxy managed by a power manager.

Power manager 422 and activity proxy logic 406 have memory and a dynamic control module that provides for assigning what specific counters will count what specific activities as well as dynamically determining and setting the weight to the activity based on either phases of application execution, types of application being executed, performance of applications being executed, or the like. As is illustrated above, one of the key programmable elements of the activity proxy architecture is the weight assigned to each activity count. For example, in the case where power is defined as $P=\Sigma(W_i*A_i)+C$, where $A_i$ is an activity count, $W_i$ is the associated weight, and C is a constant that may be added, rather than the weights being static as is known in current activity proxy architectures, in the illustrative embodiments each of weights ($W_i$) may be dynamically programmed based on the feedback gathered from the program during run-time. Such a scheme has the advantage of improving accuracy of the activity proxy architecture. Additionally, in order to dynamically tune the activity proxy architecture during run-time, the illustrative embodiments may use different models for activity proxy architecture. That is, assuming an underlying hardware where different models of power approximation are implemented, the dynamic approach may also decide which model to use to have better accuracy. For example, one model may be a linear combination of activity counts such as $\Sigma(W_i*A_i)+C$, where a second model may be a combination of linear and non-linear activity counts such as $W1*A1+W2*\log(A2)+C$. Depending on the model type, a better fit may be possible and the dynamic approach decides which model to use depending on the program phase.

Figure 5:
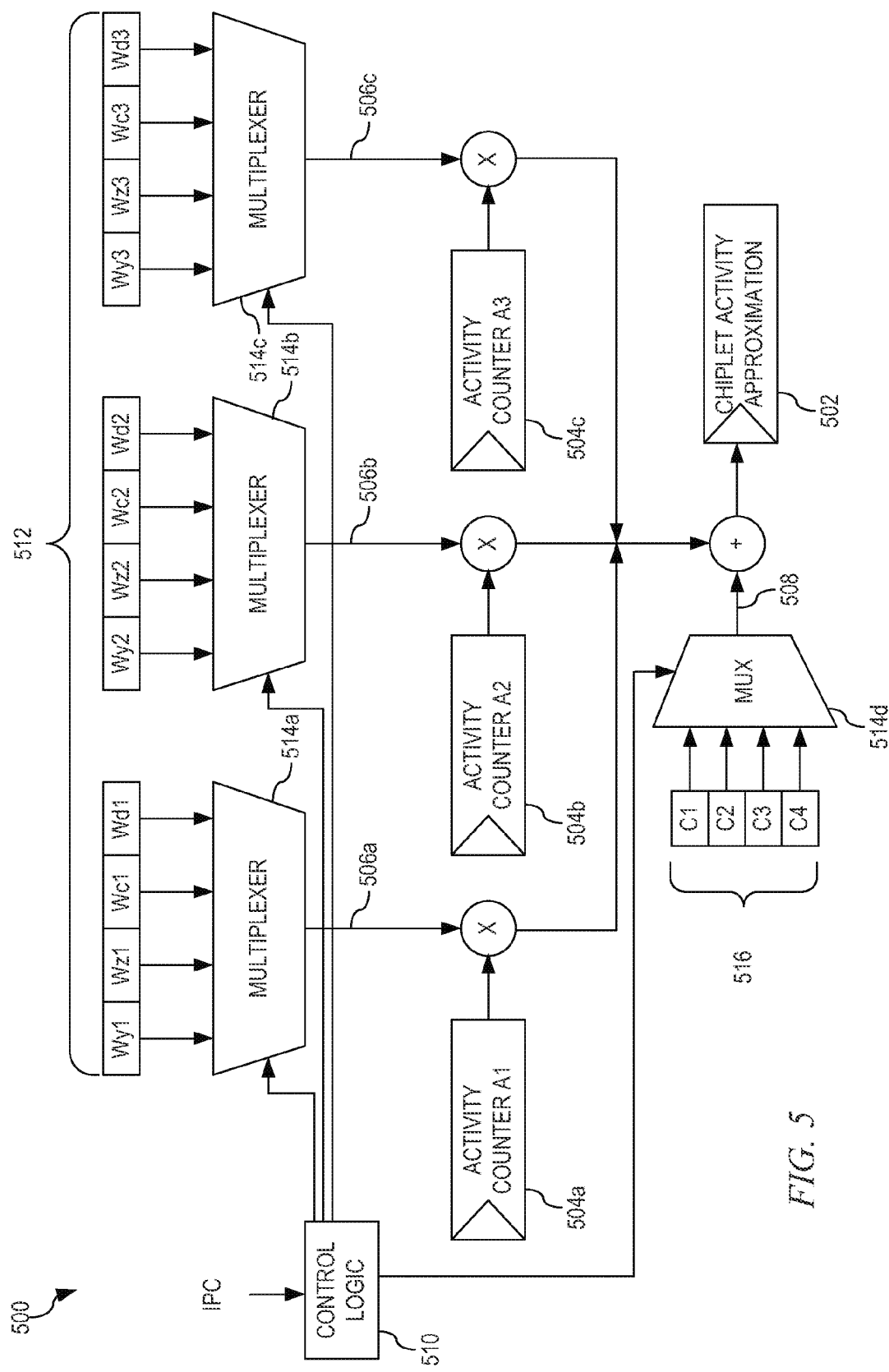
FIG. 5 depicts one example where a selection of a plurality of predetermined weights and a plurality of predetermined constants is made based on conditions within the data processing system in accordance with an illustrative embodiment.

FIG. 5 depicts one example where a selection of a plurality of predetermined weights and a plurality of predetermined constants is made based on conditions within the data processing system in accordance with an illustrative embodiment. For simplicity, this example approximates chiplet activity 502 from three activity counters 504a, 504b, and 504c, three dynamically selected weights 506a, 506b, and 506c, and one dynamically selected constant value 508. In data processing system 500, control logic 510, from a finite state machine (not shown) of the activity proxy logic, such as activity proxy logic 406 of FIG. 4, receives inputs that correlate to conditions related to the application being executed on the specific core to which the activity proxy logic is associated, such as instructions completed per cycle, number of threads in operation, voltage, temperature, voltage leakage, or the like. During execution of the application, control logic 510 receives the input, for example, instructions completed per cycle related to the application being executed. Control logic 510 then determines which weight from a plurality of predetermined weights and which constant from a plurality of predetermined constants should be selected based on the received instructions completed per cycle. That is, for each of activity counters 504a, 504b, and 504c, there are four possible predetermined weights 512 that may be used for power approximation as well as four possible predetermined constants 516 that may be added to the power approximation. Weights Wy1, Wz1, Wc1, and Wd1 are associated with activity counter 504a, weights Wy2, Wz2, Wc2, and Wd2 are associated with activity counter 504b, weights Wy3, Wz3, Wc3, and Wd3 are associated with activity counter 504c, and constants C1, C2, C3, and C4 are constants that may be added to the power approximation.

Depending on the instructions completed per cycle range, four different estimations with different weights and constant values are used for activity proxy architecture. For example, if control logic 510 determines that the instructions completed per cycle are less than or equal to a first predetermined value, then control logic 510 may send select signals to multiplexers 514a-514d such that the power for activity counters 504a, 504b, and 504c may be approximated using the following model:

$$P=Wy1*A1+Wy2*A2+Wy3*A3+C1$$

If control logic 510 determines that the instructions completed per cycle are greater than the first predetermined value but less than or equal to a second predetermined value, then control logic 510 may send select signals to multiplexers 514a-514d such that the power for activity counters 504a, 504b, and 504c may be approximated using the following model:

$$P=Wz1*A1+Wz2*A2+Wz3*A3+C2$$

If control logic 510 determines that the instructions completed per cycle are greater than the second predetermined value but less than or equal to a third predetermined value, then control logic 510 may send select signals to multiplexers 514a-514d such that the power for activity counters 504a, 504b, and 504c may be approximated using the following model:

$$P=Wc1*A1+Wc2*A2+Wc3*A3+C3$$

Finally, if control logic 510 determines that the instructions completed per cycle are greater than the third predetermined value, then control logic 510 may send select signals to multiplexers 514a-514d such that the power for activity counters 504a, 504b, and 504c may be approximated using the following model:

$$P=Wd1*A1+Wd2*A2+Wd3*A3+C4$$

While FIG. 5 illustrates only four different instructions completed per cycle ranges, one of ordinary skill in the art will recognize that more or fewer instructions completed per cycle ranges may be used without departing from the spirit and scope of the invention.

While FIG. 5 depicts that the plurality of predetermined weights and a plurality of predetermined constants are determined based on conditions within the data processing system, the illustrative embodiments recognize that one or more of the plurality of predetermined weights may be preset. Additionally, while preset weights and constants may be used and/or a plurality of predetermined weights and a plurality of predetermined constants may be selected based on instructions completed per cycle of the application that is being executed by a core, the illustrative embodiments are not limited to using only predetermined weights. That is, rather than using preset or predetermined weights and constants and control logic within the power proxies to determine which weight or constant should be selected, the illustrate embodiments may utilize power manager, such as power manager 422 to make decisions as to which weight should be used by each activity counter and which constants should be added to the chiplet activity approximation. Further, rather than the various power proxies performing computations to multiply the attribute counters with their associated weight and adding the results together along with a constant to approximate the power being used by the various activities being executed in a processor core, the illustrative embodiment recognize that these computations may be performed directly by a power manager, such as power manager 422 of FIG. 4.

Thus, as described by FIG. 5, the aggregated activity estimate value, which is indicative of the power being used by each processor in executing activities of a workload, collected by power manager 422 may be, by returning to FIG. 4, retrieved by management control logic 402 and transferred to characterization and modeling logic 404. For each processor, characterization and modeling logic 404 multiples the aggregated activity estimate value with a frequency scaling factor. Characterization and modeling logic 404 determines the frequency scaling factor by dividing a real-time measured frequency value by a specified fixed-frequency value. Again, the specified fixed-frequency value is a frequency value of a desired fixed-frequency mode specified by a user of data processing system 400 in order to determine a difference between the fixed-frequency mode and a current operating mode of data processing system 400. By characterization and modeling logic 404 multiplying with the aggregated activity estimate value with the frequency scaling factor, characterization and modeling logic 404 obtains an frequency-scaled activity proxy counter value which is indicative of the activities being executed by the processors within data processing system 400 as a value of the specified fixed-frequency value.

Using vital processor data that is provided by the manufacturer and/or calculated at deployment time of data processing system 400 and stored in storage 416, characterization and modeling logic 404 determines a slope of for the processor as shipped (slope_shipped) to be utilized as a power scaling factor. Characterization and modeling logic 404 obtains the slope_shipped value utilizing the following equation:

$$\text{Slope\_shipped}=((\text{VPD\_pwr\_noml\_shipped}-\text{idle\_proc\_pwr\_shipped}(T))*\text{slope\_char}/(\text{VPD\_pwr\_nom\_char}-\text{idle\_proc\_pwr\_char}(T))$$

In this equation, idle_proc_pwr_char(T) value represents the idle power utilized by a processor under no workload prior to shipping. The idle_proc_pwr_char(T) value is a characteristic value for a processor within a same platform, for example, if the current processor is a processor in a blade server, then characterization and modeling logic 404 utilizes a idle_proc_pwr_char(T) value obtained from a vital product data (VPD) data structure in storage 416 for a processor characterized at the manufacturer as the idle_proc_pwr_char(T) value. The idle_proc_pwr_shipped(T) value represents the idle power utilized by the processor under no workload after shipping and, thus, is specific to the current device and processor.

Both the idle_proc_pwr_char(T) value and the idle_proc_pwr_shipped(T) value are obtained by management control logic 402 measuring idle power at different temperatures T, for example, for a range of 40° C. to 80° C. Management control logic 402 initially sets T to a low end of the range, i.e. 40° C. thereby forming $T_{thr1}$. Data processing system 400 then operates with no workload until the temperature associated with processors 418 stabilize to $T_{thr1}$. Once the temperature in data processing system 400 reaches $T_{thr1}$ as monitored by one or more of thermal sensors 410, management control logic 402 measures a first total processor power value $P_1$ via power sensors 408. Management control logic 402 then sets T to a mid-point of the range, i.e. 60° C. thereby forming $T_{thr2}$. Data processing system 400 then operates with no workload until the temperature associated with processors 418 stabilize to $T_{thr2}$. Once the temperature in data processing system 400 reaches $T_{thr2}$ as monitored by one or more of thermal sensors 410, management control logic 402 measures a second total processor power value $P_2$ via power sensors 408. Management control logic 402 then sets T to a high end of the range, i.e. 80° C. thereby forming $T_{thr3}$. Data processing system 400 then operates with no workload until the temperature associated with processors 418 stabilize to $T_{thr3}$. Once the temperature in data processing system 400 reaches $T_{thr3}$ as monitored by one or more of thermal sensors 410, management control logic 402 measures a third total processor power value $P_3$ via power sensors 408.

Management control logic 402 then calculates a cool idle power slope value (idle_pwr_slope_cool) and a hot idle power slope value (idle_pwr_slope_hot) using the following equations:

$$\text{idle\_pwr\_slope\_cool} = (P2-P1)/(T_{thr2}-T_{thr1}), \text{ and}$$

$$\text{idle\_pwr\_slope\_hot} = (P3-P2)/(T_{thr3}-T_{thr2}).$$

Thus, the cool idle power slope value (idle_pwr_slope_cool) and the hot idle power slope value (idle_pwr_slope_hot) may be, for example, ½ watt per degree Celsius, ⅜ watt per degree Celsius, ¼ watt per degree Celsius, or the like. Further, while the current example uses Celsius as the basis for temperature measurement, the illustrative embodiments are not limited to using only temperature measurements in Celsius. That is, any unit of measurement for temperature may be used, such as Fahrenheit, Kelvin, or the like.

Then, in order to obtain idle processor power values for all temperatures in the range of 40.1° C. to 59.9° C. and 60.1° C. to 79.9° C., management control logic 402 uses:
- the current total processor power value $P_2$ for the range of 40.1° C. to 59.9° C. and $P_3$ for the range of 60.1° C. to 79.9° C.,
- a highest temperature value $T_{char}$ which would be 60° C. for the range of 40.1° C. to 59.9° C. and 80° C. for the range of 60.1° C. to 79.9° C.,
- the desired temperature $T_{des}$, and
- the cool idle power slope value (idle_pwr_slope_cool) for the range of 40.1° C. to 59.9° C. and a hot idle power slope value (idle_pwr_slope_hot) for the range of 60.1° C. to 79.9° C.

Utilizing these values, management control logic 402 derives the idle processor power values utilizing the idle processor power (idle_proc_pwr(T)) model equation:

for 40.1° C. to 59.9° C.:

$$\text{idle\_proc\_pwr}(T) = P_2 + (T_{des} - 60° C.) * \text{idle\_pwr\_slope\_cool}$$

for 60.1° C. to 79.9° C.:

$$\text{idle\_proc\_pwr}(T) = P_3 + (T_{des} - 80° C.) * \text{idle\_pwr\_slope\_hot}.$$

Once these calculations are completed for the desired temperature range, both at the manufacturer and in the field, management control logic 402 stores idle_proc_pwr_char(T) values and the idle_proc_pwr_shipped(T) values as separate data structures in storage 416.

Returning to the slope_shipped equation, similar to the idle_proc_pwr_char(T) value that represents the idle power utilized by a processor under no workload prior to shipping, the nominal power characteristic of the processor prior to shipping is represented by the VPD_pwr_nom_char value. Also, similar to the idle_proc_pwr_shipped(T) value the represents the idle power utilized by the processor under no workload after shipping, the nominal power of the processor after shipment is represented by the VPD_pwr_noml_shipped value. Both the VPD_pwr_nom_char value and the VPD_pwr_noml_shipped value are determined by management control logic 402 initiating a constant and unvarying workload on processors 418 while keeping voltage and frequency levels steady. Management control logic 402 obtains a current total processor power value $P_{meas}$ for processors 418 via power sensors 408 in order to establish a characteristic processor power value VPD_pwr_nom_char value while at the manufacturer and a VPD_pwr_noml_shipped value when initialized in the field. Similar to the idle_proc_pwr_char(T) value that represents the idle power utilized by a processor under no workload prior to shipping, the nominal power characteristic of the processor prior to shipping represented by the VPD_pwr_nom_char value may be for a similar processor within a same platform and not the actual processor.

The final component of the slope_shipped equation is the characteristic slope of the processor (slope_char). The slope_char value is obtained by management control logic 402 initiating a variety of workload on processors 418 while keeping voltage and frequency levels steady. For each workload, management control logic 402 obtains a current total processor power value $P_{meas}$ for processors 418 via power sensors 408 as well as a aggregated activity estimate value $U_{meas}$ from activity proxy logic 406. After all the workload have been run, management control logic 402 obtains the slope_char value using the slope formula of:

$$\text{slope\_char} = (P_{meas2} - P_{meas1})/(U_{meas2} - U_{meas1})$$

Once the slope_char value is obtained, management control logic 402 then calculates the slope_shipped value equation above and transfers this value to characterization and modeling logic 404.

Characterization and modeling logic 404 multiplies the power scaling factor with the frequency-scaled activity proxy counter value to obtain a modeled active power value. Based on a current operating temperature of data processing system 400 obtained via management control logic 402 from thermal sensors 410, characterization and modeling logic 404 identifies a shipped temperature dependent idle power value from a data structure of temperature dependent idle processor power values stored in storage 416, derived as detailed above.

Characterization and modeling logic 404 adds the identified temperature dependent idle processor power value to the modeled active power value to obtain a modeled processor power value. In order to obtain a modeled total nominal power value for data processing system 400 during the current time interval, characterization and modeling logic 404 adds the modeled processor power value for each processor in data processing system 400, a measured fan power value for the current time interval (described in detail below), as well as other measured power values associated with power consuming devices in data processing system 400, such as memory device power, input/output (I/O) device power, service processor power, or the like.

With regard to the other measured power values associated with power consuming devices in data processing system 400, management control logic 402 obtains these directly through power sensors 408. These power values are normally fixed values or power values that do not vary significantly and, thus, may be considered constant once measured. With regard to the fan power value, management control logic obtains this value by management control logic 402 deriving the change in RPM as a function of temperature change $\Delta RPM/°C$. by, under the constant workload on processors 418, setting current thermal threshold value $T_{thr\_c}$ to a low end of a range of potential thermal threshold values $T_{thr}$, for example, for a range of 40° C. to 80° C., management control logic 402 would initially set $T_{thr\_c}$ to 40° C. thereby forming $T_{thr1}$. Data processing system 400 then processes the current workload until the temperature associated with processors 418 stabilizes. Once the temperature in data processing system 400 stabilizes, management control logic 402 measures a first fan speed in revolutions per minute $RPM_1$ via RPM sensors 414. Management control logic 402 then sets current thermal threshold value $T_{thr\_c}$ to a high end of a range of potential thermal threshold values $T_{thr}$, for example, for a range of 40° C. to 80° C., management control logic 402 would set $T_{thr\_c}$ to 80° C. thereby forming $T_{thr2}$. Data processing system 400 then processes the current workload until the temperature associated with processors 418 stabilizes. Once the temperature in data processing system 400 stabilizes, management control logic 402 measures a second fan speed in revolutions per minute $RPM_2$ via RPM sensors 414. Management control logic 402 then calculates the change in RPM as a function of temperature change $\Delta RPM/°C$. value using the following change in RPM equation:

$$\Delta RPM/°C.=(RPM_2-RPM_1)/(T_{thr2}-T_{thr1})$$

With the obtained and derived characteristic information, management control logic 402 is then able to determine an optimal thermal threshold and fan power setting that minimizes system power without performance penalty and with fast convergence at runtime. That is, at runtime, management control logic retrieves a current thermal threshold value $T_{thr\_c}$ from a set of thermal thresholds in storage 416 that becomes the first thermal threshold under evaluation, a current total processor power value $P_{meas}$ for processors 418 via power sensors 408, a set of temperature values $T_{meas}$ read from thermal sensors 410 for processors 418, and an ambient temperature value $T_{amb}$ for data processing system 400.

Management control logic 402 uses the current total processor power value $P_{meas}$, a highest temperature value $T_{max}$ from the set of temperature values $T_{meas}$, the current thermal threshold value $T_{thr\_c}$, and the $P_{leak\_per\_°C}$ scaling factor to calculate a total processor power value at the current thermal threshold value under consideration $P_{proc@Tthr\_c}$ using the following total processor power model equation:

$$P_{proc@Tthr\_c}=P_{meas}+(T_{thr\_c}-T_{max})*P_{leak\_per\_°C.}$$

With $P_{proc@Tthr\_c}$ determined, management control logic 402 determines a revolutions per minute value (RPM) required for a fan to reach the current thermal threshold value $T_{thr\_c}$. Management control logic 402 uses the previously calculated total processor power value at the current thermal threshold value $P_{proc@Tthr\_c}$, the current ambient temperature value $T_{amb}$ for data processing system 400, the current thermal threshold value $T_{thr\_c}$, and the change in RPM as a function of temperature change $\Delta RPM/°C$. value to determine an RPM value using the following RPM model equation:

$$RPM=((((P_{proc@Tthr\_c}/P_{proc\_char})*(T_{thr\_char}-T_{amb\_char}))+T_{amb})-T_{thr\_c})*\Delta RPM/°C.+RPM_{char}.$$

Based on the determined RPM value for the fan, management control logic 402 identifies a fan power value $P_{fan}$ using a lookup table or, if a lookup table for the particular fan is not available, deriving its own fan power table. That is, normally, there are known wattage ratings associated with each fan speed based on the manufacturing model of the fan installed in data processing system 400. Thus, management control logic 402 uses the determined RPM required for a fan to reach a desired temperature to identify in the lookup table what the fan power value $P_{fan}$ will be used at the determined RPM. However, in some instances lookup tables may not be available. Thus, management control logic 402 may derive a fan power model by initially setting the RPMs of a fan to a minimum rated RPM value for the fan and wait for the fan to reach the set RPM value. Once the fan reaches the set RPM value, management control logic 402 measures the power being consumed by the fan and stores the measured power value in a fan power table or other data structure. Management control logic 402 then increments the current RPM setting by an incremental value $\Delta RPM$ and determines whether the new RPM setting is greater than or equal to a maximum rated RPM value of the fan. If the new RPM setting is not greater than or equal to the maximum rated RPM value of the fan, then management control logic 402 sets the RPMs of a fan to the new RPM setting and waits for the fan to reach the set RPM value. Once the fan reaches the set RPM value, management control logic 402 again measures the power being consumed by the fan and stores the measure power value in the fan power table or other data structure, with the process repeating until the new RPM setting is greater than or equal to a maximum rated RPM value of the fan. If the incremental value is such that the fan power table does not comprise some power values for some RPM values, then management control logic 402 may use existing algorithms as a function of RPM to derive the unknown power values based upon other RPM and power values in the fan power table. Therefore, based on the determined RPM value for the fan, management control logic 402 may identify the fan power value $P_{fan}$ from the derived fan power table.

By characterization and modeling logic 404 adding the modeled processor power value for each processor in data processing system 400, the measured fan power value for the current time interval, as well as other measured power values associated with power consuming devices in data processing system 400, characterization and modeling logic 404 obtains the modeled total nominal power value for data processing system 400 during the current time interval, which characterization and modeling logic 304 stores in storage 316.

In order to provide a comparison of determined modeled total nominal power values in relation to the dynamic power management mode value, for each time interval, management control logic 402 determines a dynamic power management mode power value, which management control logic 402 also stores in storage 416 associated with the modeled processor power value of the same time interval. In order to determine dynamic power management mode power value, management control logic 402 implements logic in a final power model that provides a run-time fixed-frequency power estimation in the dynamic power saving mode.

For each subsequent time interval, characterization and modeling logic 404 again determines a new modeled total nominal power value and management control logic 402 determines a dynamic power management mode power value. During each subsequent operation, the temperature of data processing system 400 will rise and fall with the work being performed which not only effects the temperature dependent idle power value but all the fan power value as the fan speed will change with the temperature change. Thus, characterization and modeling logic 404 stores the modeled total nominal power value for the current interval in storage 416 and management control logic 402 stores the determined dynamic power management mode power value in storage 416 associated with the modeled processor power value of the same time interval.

Finally, once characterization and modeling logic 404 stores a plurality of modeled total nominal power values and management control logic 402 stores a plurality of dynamic power management mode power values for a specified time period, characterization and modeling logic 404 and/or management control logic 404 may provide a comparison of the plurality of modeled total nominal power values and the plurality of dynamic power management mode power values to the user such as through a graphical representation, a numerical representation, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
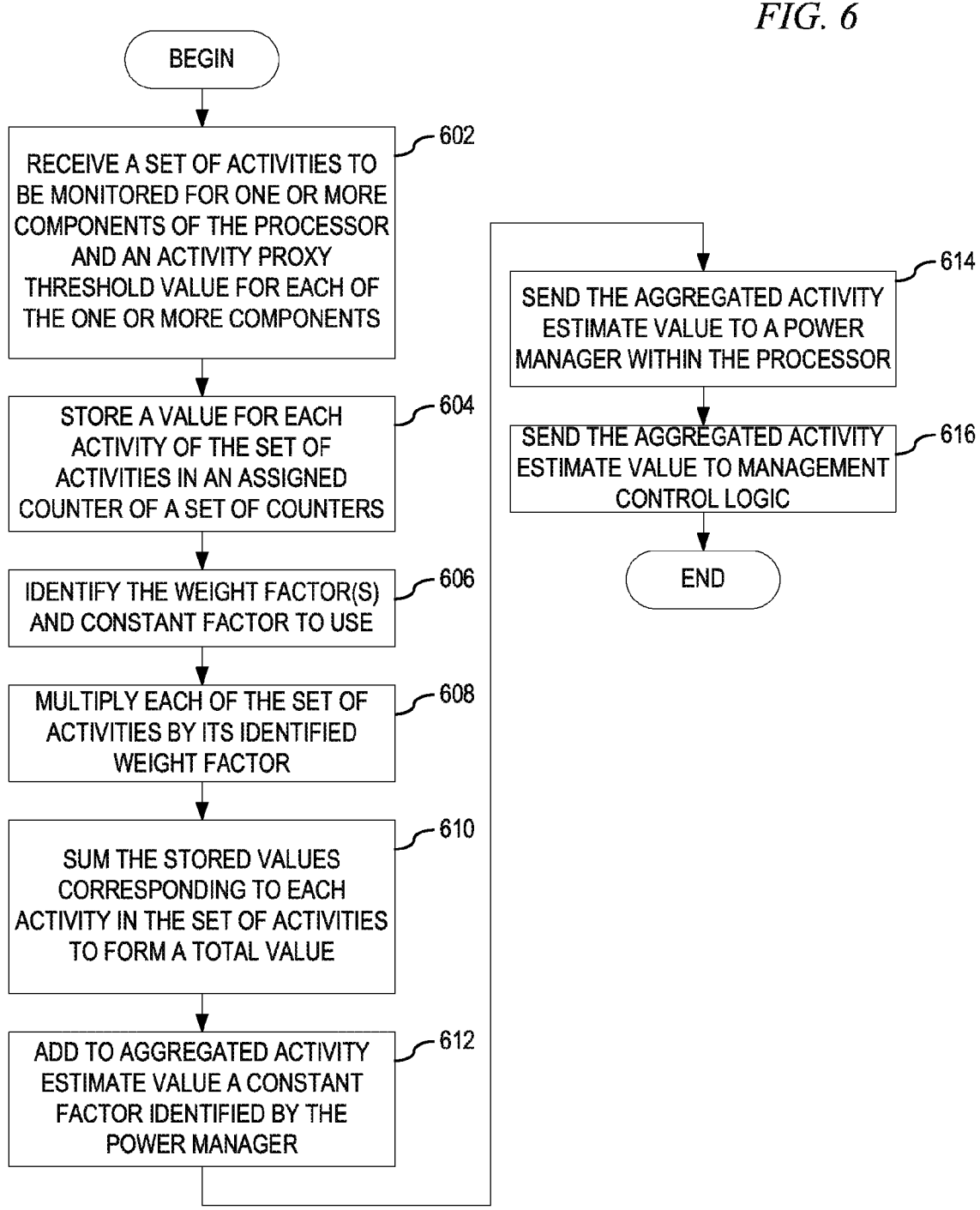
FIG. 6 is a flowchart illustrating an exemplary operation performed to obtain an aggregated activity estimate value within a processor in accordance with an illustrative embodiment.

FIG. 6 is a flowchart illustrating an exemplary operation performed to obtain an aggregated activity estimate value within a processor in accordance with an illustrative embodiment. The operation of FIG. 6 may be implemented in a processor, such as processor 318 of FIG. 3 or 418 of FIG. 4. As the operation begins, a power manager within the processor receives a set of activities to be monitored for one or more components of the processor and an activity proxy threshold value for each of the one or more components (step 602). Activity proxy logic for each monitored component stores a value for each activity of the set of activities in an assigned counter of a set of counters, forming a set of stored values, wherein the value comprises the count will be multiplied by a weight factor specific to the activity (step 604).

Prior to multiplying each of the stored values for each of the subset of activities to its associated weight factor, for each subset of activities, the power manager determines the weight factor that will be used. In this example, rather than using preset or predetermined weights and constants and control logic within the power proxies to determine which weight or constant should be selected, a decision as to which weight should be used by each activity counter and which constants should be added to the power approximation may be made by a power manager, such as power manager 402 of FIG. 4. The weight factor and constant factor may be based on conditions related to the application being executed on the specific core to which the activity proxy logic is associated, such as instructions completed per cycle, number of threads in operation, voltage, temperature, voltage leakage, or the like. Based on the conditions related to the application being executed on the specific core, the power manager may identify the weight factor and constant factor to use (step 606).

The activity proxy logic then multiplies the total value for each stored value by the identified weight factor that corresponds to the activity (step 608). The activity proxy logic sums the stored values corresponding to each activity in the set of activities to form a total value for the set of activities (step 610). While summing the stored values for the set of activities to form an aggregated activity estimate value, the activity proxy logic also adds to aggregated activity estimate value a constant factor identified by the power manager (step 612). The activity proxy logic then sends the aggregated activity estimate value to a power manager within the processor (step 614) and onto management control logic within the data processing system (step 616), with the operation terminating thereafter.

FIG. 7 depicts a flowchart outlining exemplary operations for deriving an idle processor power, either characterized or shipped, in accordance with an illustrative embodiment. As the operation begins, management control logic initiates a constant workload on a set of processors in a data processing system (step 702). The management control logic sets a current thermal value T to a low end of a range (step 704). For example, for a range of 40° C. to 80° C., the management control logic would initially set $T_{thr1}$ to 40° C. The data processing system then processes the current workload until the temperature associated with the processors stabilizes (step 706). The management control logic determines whether the temperature has stabilized by monitoring the ambient temperature of the data processing system via a thermal sensor (step 708). If at step 708 the temperature of the data processing system has not stabilized, then the operation returns to step 706. If at step 708 the temperature of the data processing system has stabilized, the management control logic measures a first total processor power value $P_1$ (step 710).

The management control logic then sets the current thermal value T to a midpoint of the range (step 712). For example, for a range of 40° C. to 80° C., the management control logic would set T to 80° C. thereby forming $T_{thr2}$. The data processing system then processes the current workload until the temperature associated with the processors stabilizes (step 714). The management control unit determines whether the temperature has stabilized by monitoring the ambient temperature of the data processing system via a thermal sensor (step 716). If at step 716 the temperature of the data processing system has not stabilized, then the operation returns to step 714. If at step 716 the temperature of the data processing system has stabilized, the management control unit measures a second total processor power value $P_2$ (step 718).

The management control logic then sets the current thermal value T to a high end of a range (step 720). For example, for a range of 40° C. to 80° C., the management control logic would set T to 80° C. thereby forming $T_{thr3}$. The data processing system then processes the current workload until the temperature associated with the processors stabilizes (step 722). The management control unit determines whether the temperature has stabilized by monitoring the ambient temperature of the data processing system via a thermal sensor (step 724). If at step 724 the temperature of the data processing system has not stabilized, then the operation returns to step 722. If at step 724 the temperature of the data processing system has stabilized, the management control unit measures a third total processor power value $P_3$ (step 726). The management control unit then calculates a cool idle power slope value (idle_pwr_slope_cool) and a hot idle power slope value (idle_pwr_slope_hot) (step 728) using the following equations:

$$\text{idle\_pwr\_slope\_cool}=(P2-P1)/(T_{thr2}-T_{thr1}), \text{ and}$$

$$\text{idle\_pwr\_slope\_hot}=(P3-P2)/(T_{thr3}-T_{thr2}).$$

Thus, the cool idle power slope value (idle_pwr_slope_cool) and the hot idle power slope value (idle_pwr_slope_hot) may be, for example, ½ watt per degree Celsius, ⅜ watt per degree Celsius, ¼ watt per degree Celsius, or the like. Further, while the current example uses Celsius as the basis for temperature measurement, the illustrative embodiments are not limited to using only temperature measurements in Celsius. That is, any unit of measurement for temperature may be used, such as Fahrenheit, Kelvin, or the like.

The management control logic then derives the unknown idle processor power values (step 730) utilizing the idle processor power (idle_proc_pwr(T)) model equation:

for temperatures between low temperature and midpoint temperature:

$$\text{idle\_proc\_pwr}(T)=P_2+(T_{des}-\text{midpoint temperature})*\text{idle\_pwr\_slope\_cool}$$

for temperatures between midpoint temperature and high temperature:

$$\text{idle\_proc\_pwr}(T)=P_3+(T_{des}-\text{high temperature})*\text{idle\_pwr\_slope\_hot}.$$

Once these calculations are completed for the desired temperature range, both at the manufacturer and in the field, the management control logic then stores idle processor power values as separate data structures in a storage (step 732), with the operation ending thereafter.

Figure 8:
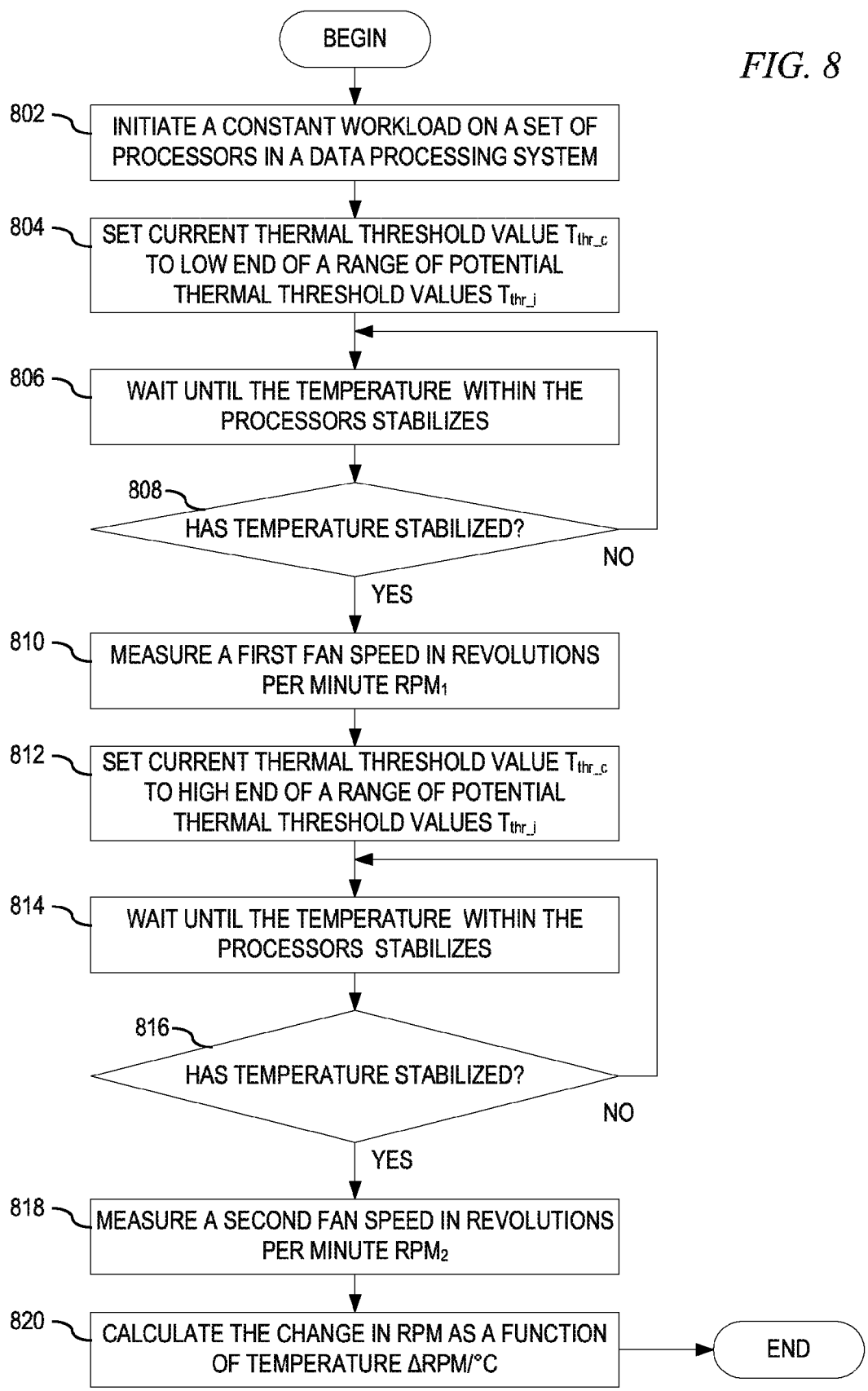
FIG. 8 depicts a flowchart outlining exemplary operations for deriving change in RPM as a function of temperature change $\Delta RPM/^\circ C$. in accordance with an illustrative embodiment.

FIG. 8 depicts a flowchart outlining exemplary operations for deriving change in RPM as a function of temperature change ΔRPM/° C. in accordance with an illustrative embodiment. As the operation begins, management control logic initiates a constant workload on a set of processors in a data processing system (step 802). The management control logic sets a current thermal threshold value $T_{thr\_c}$ from a store of thermal thresholds to a low end of a range of potential thermal threshold values $T_{thr\_i}$ (step 804). For example, for a range of 40° C. to 80° C., the management control logic would initially set $T_{thr\_c}$ to 40° C. thereby forming $T_{thr1}$. The data processing system then processes the current workload until the temperature associated with the processors stabilizes (step 806). The management control logic determines whether the temperature has stabilized by monitoring the ambient temperature of the data processing system via a thermal sensor (step 808). If at step 808 the temperature of the data processing system has not stabilized, then the operation returns to step 806. If at step 808 the temperature of the data processing system has stabilized, the management control logic measures a first fan speed in revolutions per minute $RPM_1$ via a set of RPM sensors (step 810).

The management control logic then sets the current thermal threshold value $T_{thr\_c}$ to a high end of a range of potential thermal threshold values $T_{thr\_i}$ (step 812). For example, for a range of 40° C. to 80° C., the management control logic would set $T_{thr}$ to 80° C. thereby forming $T_{thr2}$. The data processing system then processes the current workload until the temperature associated with the processors stabilizes (step 814). The management control logic determines whether the temperature has stabilized by monitoring the ambient temperature of the data processing system via a thermal sensor (step 816). If at step 816 the temperature of the data processing system has not stabilized, then the operation returns to step 814. If at step 816 the temperature of the data processing system has stabilized, the management control logic measures a second fan speed in revolutions per minute $RPM_2$ via the set of RPM sensors (step 818). The management control logic then calculates the change in RPM as a function of temperature change ΔRPM/° C. value (step 820) using the following change in RPM equation:

$$\Delta RPM/° C.=(RPM_2-RPM_1)/(T_{thr2}-T_{thr1})$$

After step 820 the operation ends.

Figure 9:
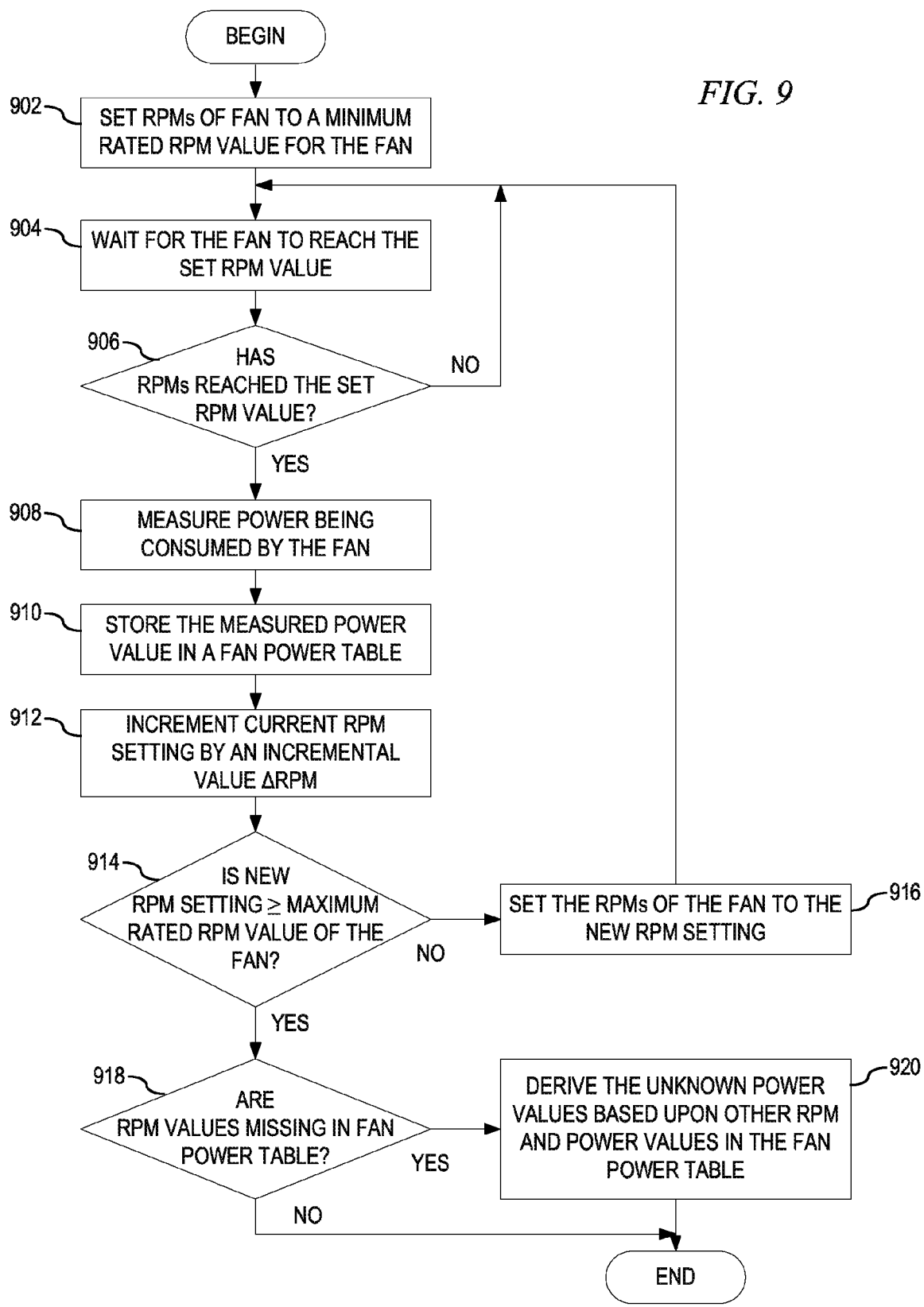
FIG. 9 depicts a flowchart outlining exemplary operations for deriving a fan power model in accordance with an illustrative embodiment.

FIG. 9 depicts a flowchart outlining exemplary operations for deriving a fan power model in accordance with an illustrative embodiment. As the operation begins, the management control logic initially sets the revolutions per minute (RPMs) of a cooling fan to a minimum rated RPM value for the fan (step 902). The management control logic then waits for the fan to reach the set RPM value (step 904). The management control logic determines whether the RPMs of the fan have reached the set RPM value as measured via an RPM sensor (step 906). If at step 906 the RPMs of the fan have not reached the RPM value, then the operation returns to step 904. If at step 906 the RPMs of the fan have reached the set RPM value, then the management control logic measures the power being consumed by the fan (step 908) and stores the measured power value in a fan power table or other data structure (step 910). The management control logic then increments the current RPM setting by an incremental value ΔRPM (step 912). The management control logic determines whether the new RPM setting is greater than or equal to a maximum rated RPM value of the fan (step 914) If at step 914 the new RPM setting is not greater than or equal to the maximum rated RPM value of the fan, then the management control logic sets the RPMs of a fan to the new RPM setting (step 916), with the operation returning to step 904 thereafter. If at step 914 the new RPM setting is greater than or equal to the maximum rated RPM value of the fan, the management control logic determines whether there are any RPM values in the fan power table or other structure that are missing (step 918). If at step 918 there are any missing RPM values, the management control logic may use existing algorithms as a function of RPM to derive the unknown power values based upon other RPM and power values in the fan power table (step 920), with the operation ending thereafter. If at step 918, there are no missing RPM values, the operation ends.

Figure 10:
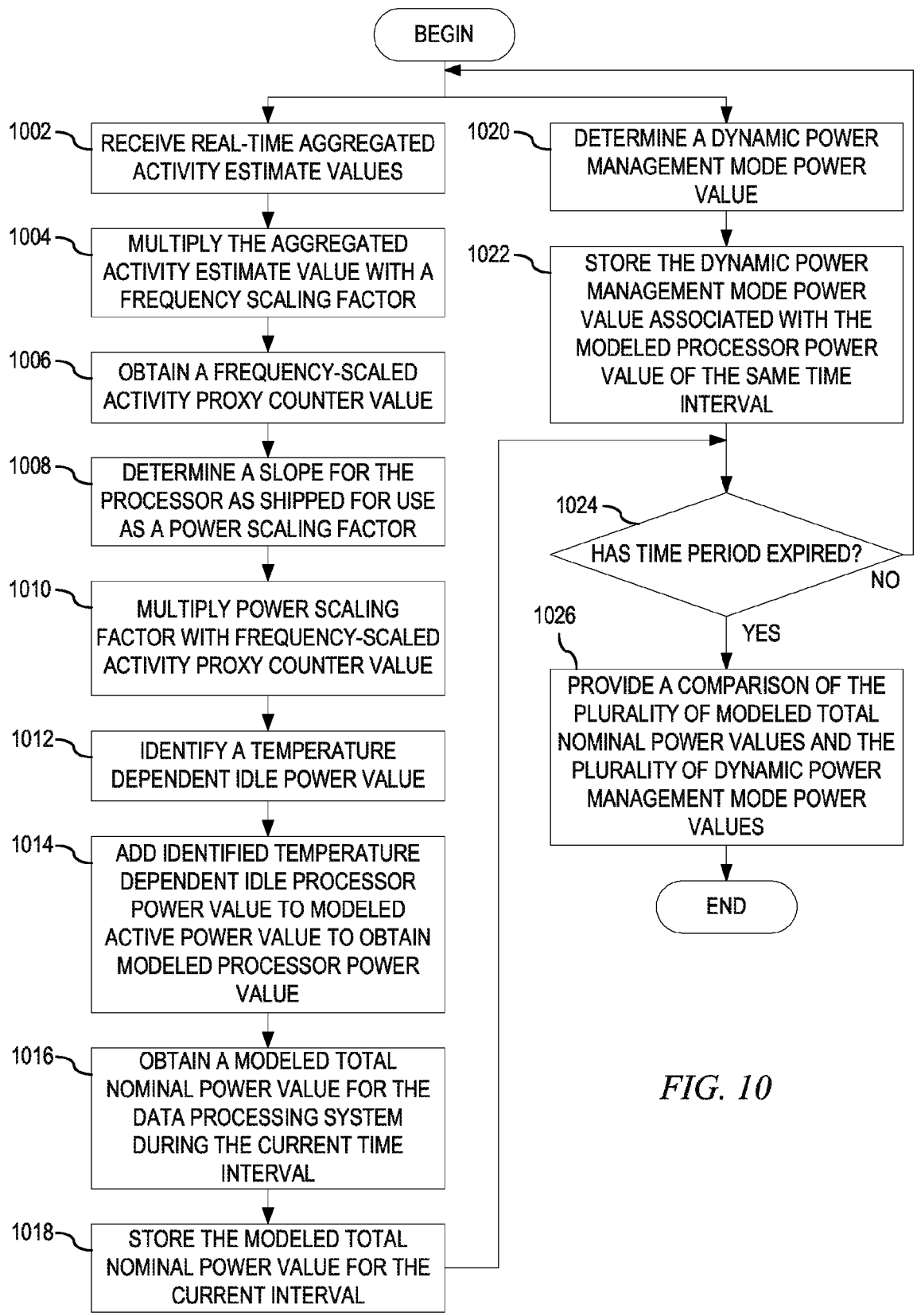
FIG. 10 depicts a flowchart outlining exemplary operations for fixed-frequency characterization and modeling to estimate energy/power consumption of a fixed-frequency operating mode while system is running in dynamic power management mode in accordance with an illustrative embodiment.

FIG. 10 depicts a flowchart outlining exemplary operations for fixed-frequency characterization and modeling to estimate energy/power consumption of a fixed-frequency operating mode while system is running in dynamic power management mode in accordance with an illustrative embodiment. As the operation begins, for each time interval within a time period, characterization and modeling logic identifies a real-time aggregated activity estimate value for each processor within a data processing system via management control logic and activity proxy logic that indicate the power being used by each processor in executing activities of a workload (step 1002). For each processor, the characterization and modeling logic multiples the aggregated activity estimate value with a frequency scaling factor (step 1004). By the characterization and modeling logic multiplying with the aggregated activity estimate value with the frequency scaling factor, the characterization and modeling logic obtains an frequency-scaled activity proxy counter value which is indicative of the activities being executed by the processors within the data processing system as a value of the specified fixed-frequency value (step 1006).

Using vital processor data that is provided by the manufacturer and/or calculated at deployment time of the data processing system and stored in storage, the characterization and modeling logic determines a slope for the processor as shipped (slope_shipped) and utilizes this value as a power scaling factor (step 1008). The characterization and modeling logic multiplies the power scaling factor with the frequency-scaled activity proxy counter value to obtain a modeled active power value (step 1010). Based on a current operating temperature of the data processing system obtained via the management control logic from a set of temperature sensors, the characterization and modeling logic identifies a shipped temperature dependent idle power value from a data structure of temperature dependent idle processor power values stored in the storage (step 1012).

The characterization and modeling logic adds the identified shipped temperature dependent idle processor power value to the modeled active power value to obtain a modeled processor power value (step 1014). In order to obtain a modeled total nominal power value for the data processing system during the current time interval, the characterization and modeling logic adds the modeled processor power value for each processor in the data processing system, a measured fan power value for the current time interval, as well as other measured power values associated with power consuming devices in the data processing system, such as memory device power, input/output (I/O) device power, service processor power, or the like (step 1016). The characterization and modeling logic stores the modeled total nominal power value for the current interval in the storage (step 1018).

In order to provide a comparison of determined modeled total nominal power values in relation to the dynamic power management mode value, for each time interval within the time period, management control logic determines a dynamic power management mode power value (step 1020). The management control logic stores the dynamic power management mode power value in the storage associated with the modeled processor power value of the same time interval (step 1022). The characterization and modeling logic and the management control logic then determine whether the time period has expired (step 1024). If at step 1024 the time period has not expired, then the operation returns to step 1002 and 1020. If at step 1024 the time period has expired, then the characterization and modeling logic and/or the management control logic provides a comparison of the plurality of modeled total nominal power values and the plurality of dynamic power management mode power values (step 1026), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms that enable customers to visualize their energy savings when running servers in a variable-frequency power-saving mode over a fixed-frequency nominal mode without actually running in the nominal mode. The mechanisms provide an accurate power modeling method based on power-correlated activity counters and one-time system characterizations of processor, fan and other server components.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for estimating energy/power consumption of a fixed-frequency operating mode while the data processing system is running in a dynamic power management mode, the method comprising:

for each time interval in a plurality of time intervals within a time period:

identifying, by a first processor, a modeled total nominal power value for a second processor in the data processing system during a current time interval, wherein identifying the modeled total nominal power value for the second processor in the data processing system during the current time interval comprises:

identifying, by the first processor, an aggregated activity estimate value for the second processor within the data processing system that indicates the power being used by the second processor in executing activities of a workload in the current time interval as detected by a power sensor associated with the second processor;

multiplying, by the first processor, the aggregated activity estimate value with a frequency scaling factor thereby producing a frequency-scaled activity proxy counter value that is indicative of the activities being executed by the second processor as a value of a specified fixed-frequency value;

utilizing, vital processor data for the second processor, determining, by the first processor, a power scaling factor for the second processor;

multiplying, by the first processor, the power scaling factor with the frequency-scaled activity proxy counter value in order to obtain a modeled active power value;

utilizing a current operating temperature of the data processing system as detected by a thermal sensor associated with the data processing system, identifying, by the first processor, a shipped temperature dependent idle power value for the second processor;

adding, by the first processor, the identified shipped temperature dependent idle processor power value to the modeled active power value to obtain a modeled processor power value; and adding, by the first processor, the modeled processor power value for the second processor to at least one of: a measured fan power value for a fan in the data processing system for the current time interval as detected by a power sensor associated with the fan, a measured power value for a memory device in the data processing system as detected by a power sensor associated with the memory device, a measured power value for an input/output (I/O) device in the data processing system as detected by a power sensor associated with the I/O device, or a measured power value for a service processor in the data processing system as detected by a power sensor associated with the service processor in order to obtain the modeled total nominal power value for the second processor during the current time interval;

storing, by the first processor, the modeled total nominal power value for the current time interval in a storage, wherein, for the plurality of time intervals, the first processor stores a plurality of modeled total nominal power values;

identifying, by the first processor, a dynamic power management mode power value for the second processor in the data processing system during the current interval; and storing, by the first processor, the dynamic power management mode power value for the current time interval in the storage, wherein, for the plurality of time intervals, the first processor stores a plurality of dynamic power management mode power values; and responsive to the time period expiring, producing, by the first processor, a comparison of the plurality of modeled total nominal power values and the plurality of dynamic power management mode power values over the time intervals in the plurality of time intervals in the time period.

2. The method of claim 1, wherein the vital product data is provided either by a manufacturer or calculated at deployment time of the data processing system.

3. The method of claim 1, wherein the aggregated activity estimate value is determined by the method comprising:

receiving, by the first processor, a set of activities to be monitored for one or more components of the second processor and an activity proxy threshold value for each of the one or more components;

storing, by the first processor, a value for each activity of the set of activities in an assigned counter of a set of counters, forming a set of stored values;

identifying, by the first processor, a weight factor specific to each activity;

multiplying, by the first processor, each stored value for each activity to the identified weight factor that corresponds to the activity thereby producing a set of weighted values;

summing, by the first processor, the set of weighted values to form a total value for the set of activities; and adding, by the first processor, the total value to a constant factor in order to form the aggregated activity estimate value.

4. The method of claim 1, wherein the a power scaling factor for the second processor is determined by identifying a slope_shipped value utilizing the following equation:

$$\text{Slope\_shipped} = ((\text{VPD\_pwr\_noml\_shipped} - \text{idle\_proc\_pwr\_shipped}(T))*\text{slope\_char})/(\text{VPD\_pwr\_nom\_char} - \text{idle\_proc\_pwr\_char}(T))$$

wherein the idle_proc_pwr_char(T) value represents idle power utilized by the second processor under no workload prior to shipping, wherein the idle_proc_pwr_shipped(T) value represents idle power utilized by the second processor under no workload after shipping, wherein the VPD_pwr_nom_char value represents a nominal power characteristic of the second processor prior to shipping, wherein the VPD_pwr_noml_shipped value represents a nominal power of the second processer after shipment, and wherein the (slope_char) value represents a characteristic slope of the second processor.

5. The method of claim 4, wherein the idle_proc_pwr_char(T) value, which is determined prior to shipping, and the idle_proc_pwr_shipped(T) value, which is determined after shipping are determined by the method comprising:

setting, by the first processor, a current thermal value T to a low end of a range;

processing, by the second processor, a current workload until a temperature associated with the second processor stabilizes as detected by a thermal sensor associated with the second processor;

determining, by the first processor, whether the temperature has stabilized by monitoring the ambient temperature of the data processing system via the thermal sensor associated with the data processing system;

responsive to the temperature of the data processing system stabilizing, measuring, by the first processor, a first total processor power value $P_1$ associated with the second processor via the power sensor associated with the second processor;

setting, by the first processor, the current thermal value T to a midpoint of the range;

processing, by the second processor, the current workload until the temperature associated with the second processor stabilizes as detected by the thermal sensor associated with the second processor;

determining, by the first processor, whether the temperature has stabilized by monitoring the ambient temperature of the data processing system via the thermal sensor associated with the data processing system;

responsive to the temperature of the data processing system stabilizing, measuring, by the first processor, a second total processor power value $P_2$ associated with the second processor via the power sensor associated with the second processor;

setting, by the first processor, the current thermal value T to a high end of the range;

processing, by the second processor, the current workload until the temperature associated with the second processor stabilizes as detected by the thermal sensor associated with the second processor;

determining, by the first processor, whether the temperature has stabilized by monitoring the ambient temperature of the data processing system via the thermal sensor associated with the data processing system;

responsive to the temperature of the data processing system stabilizing, measuring, by the first processor, a third total processor power value $P_3$ associated with the second processor via the power sensor associated with the second processor;

determining, by the first processor, a cool idle power slope value (idle_pwr_slope_cool) and a hot idle power slope value (idle_pwr_slope_hot) using the following equations:

$$\text{idle\_pwr\_slope\_cool} = (P2-P1)/(T_{thr2}-T_{thr1}), \text{ and}$$

$$\text{idle\_pwr\_slope\_hot} = (P3-P2)/(T_{thr3}-T_{thr2});$$

deriving, by the first processor, unknown idle processor power values utilizing an idle processor power (idle_proc_pwr(T)) model equation:

for temperatures between low temperature and midpoint temperature:

$$\text{idle\_proc\_pwr}(T) = P_2 + (T_{des} - \text{midpoint temperature})*\text{idle\_pwr\_slope\_cool}, \text{ and}$$

for temperatures between midpoint temperature and high temperature:

$$\text{idle\_proc\_pwr}(T) = P_3 + (T_{des} - \text{high temperature})*\text{idle\_pwr\_slope\_hot};$$

and storing, by the first processor, the derived and measured idle processor power values as a set of idle_proc_pwr_char(T) values when determined prior to shipping and a set of idle_proc_pwr_shipped(T) values when determined after shipping.

6. The method of claim 1, wherein identifying the dynamic power management mode power value for the second processor in the data processing system during the current interval comprises:
determining, by the first processor, a run-time fixed-frequency power estimation in a dynamic power saving mode.

7. A computer program product comprising a non-transitory computer readable storage medium having a computer readable program stored therein, wherein the computer readable program, when executed on a computing device, causes the computing device to:
for each time interval in a plurality of time intervals within a time period:
identify a modeled total nominal power value for a processor in the computing device during a current time interval, wherein the computer readable program to identify the modeled total nominal power value for the processor in the computing device during the current time interval further causes the computing device to:
identify an aggregated activity estimate value for the processor within the computing device that indicates the power being used by the processor in executing activities of a workload in the current time interval as detected by a power sensor associated with the processor;
multiply the aggregated activity estimate value with a frequency scaling factor thereby producing a frequency-scaled activity proxy counter value that is indicative of the activities being executed by the processor as a value of a specified fixed-frequency value;
utilizing vital processor data for the processor, determine a power scaling factor for the processor;
multiply the power scaling factor with the frequency-scaled activity proxy counter value in order to obtain a modeled active power value;
utilizing a current operating temperature of the computing device as detected by a thermal sensor associated with the computing device,
identify a shipped temperature dependent idle power value or the processor;
add the identified shipped temperature dependent idle processor power value to the modeled active power value to obtain a modeled processor power value; and
add the modeled processor power value for the processor to at least one of: a measured fan power value for a fan in the computing device for the current time interval as detected by a power sensor associated with the fan, a measured power value for a memory device in the computing device as detected by a power sensor associated with the memory device, a measured power value for an input/output (I/O) device in the computing device as detected by a power sensor associated with the I/O device, or a measured power value for a service processor in the computing device as detected by a power sensor associated with the service processor in order to obtain the modeled total nominal power value for the processor during the current time interval;
store the modeled total nominal power value for the current time interval in a storage, wherein, for the plurality of time intervals, a plurality of modeled total nominal power values are stored;

identify a dynamic power management mode power value for the processor in the computing device during the current interval; and
store the dynamic power management mode power value for the current time interval in the storage, wherein, for the plurality of time intervals, a plurality of dynamic power management mode power values are stored; and
responsive to the time period expiring, producing a comparison of the plurality of modeled total nominal power values and the plurality of dynamic power management mode power values over the time intervals in the plurality of time intervals in the time period.

8. The computer program product of claim 7, wherein the vital product data is provided either by a manufacturer or calculated at deployment time of the data processing system.

9. The computer program product of claim 7, wherein the computer readable program determines the aggregated activity estimate value by causing the computing device to:
receive a set of activities to be monitored for one or more components of the processor and an activity proxy threshold value for each of the one or more components;
store a value for each activity of the set of activities in an assigned counter of a set of counters, forming a set of stored values;
identify a weight factor specific to each activity;
multiply each stored value for each activity to the identified weight factor that corresponds to the activity thereby producing a set of weighted values;
sum the set of weighted values to form a total value for the set of activities; and
add the total value to a constant factor in order to form the aggregated activity estimate value.

10. The computer program product of claim 7, wherein the a power scaling factor for the processor is determined by the computer readable program causing the computing device to identify a slope_shipped value utilizing the following equation:

$$\text{Slope\_shipped} = ((\text{VPD\_pwr\_noml\_shipped} - \text{idle\_proc\_pwr\_shipped}(T))*\text{slope\_char}) / (\text{VPD\_pwr\_nom\_char} - \text{idle\_proc\_pwr\_char}(T))$$

wherein the idle_proc_pwr_char(T) value represents idle power utilized by the processor under no workload prior to shipping, wherein the idle_proc_pwr_shipped(T) value represents idle power utilized by the processor under no workload after shipping, wherein the VPD_pwr_nom_char value represents a nominal power characteristic of the processor prior to shipping, wherein the VPD_pwr_noml_shipped value represents a nominal power of the processer after shipment, and wherein the (slope_char) value represents a characteristic slope of the processor.

11. The computer program product of claim 10, wherein the computer readable program determines the idle_proc_pwr_char(T) value, which is determined prior to shipping, and the idle_proc_pwr_shipped(T) value, which is determined after shipping by causing the computing device to:
set a current thermal value T to a low end of a range;
process a current workload on the processor until a temperature associated with the processor stabilizes as detected by a thermal sensor associated with the processor;
determine whether the temperature has stabilized by monitoring the ambient temperature of the computing device via the thermal sensor associated with the computing device;

responsive to the temperature of the computing device stabilizing, measure a first total processor power value $P_1$ associated with the processor via the power sensor associated with the processor;

set the current thermal value T to a midpoint of the range;

process the current workload on the processor until the temperature associated with the processor stabilizes as detected by the thermal sensor associated with the processor;

determine whether the temperature has stabilized by monitoring the ambient temperature of the computing device via the thermal sensor associated with the computing device;

responsive to the temperature of the computing device stabilizing, measure a second total processor power value $P_2$ associated with the processor via the power sensor associated with the processor;

sett the current thermal value T to a high end of the range;

process the current workload on the processor until the temperature associated with the processor stabilizes as detected by the thermal sensor associated with the processor;

determine whether the temperature has stabilized by monitoring the ambient temperature of the computing device via the thermal sensor associated with the computing device;

responsive to the temperature of the computing device stabilizing, measure a third total processor power value $P_3$ associated with the processor via the power sensor associated with the processor;

determine a cool idle power slope value (idle_pwr_slope_cool) and a hot idle power slope value (idle_pwr_slope_hot) using the following equations:

$$\text{idle\_pwr\_slope\_cool} = (P2-P1)/(T_{thr2}-T_{thr1}), \text{ and}$$

$$\text{idle\_pwr\_slope\_hot} = (P3-P2)/(T_{thr3}-T_{thr2});$$

derive unknown idle processor power values utilizing an idle processor power (idle_proc_pwr(T)) model equation:

for temperatures between low temperature and midpoint temperature:

$$\text{idle\_proc\_pwr}(T) = P_2 + (T_{des} - \text{midpoint temperature})^* \text{idle\_pwr\_slope\_cool, and}$$

for temperatures between midpoint temperature and high temperature:

$$\text{idle\_proc\_pwr}(T) = P_3 + (T_{des} - \text{high temperature})^* \text{idle\_pwr\_slope\_hot; and}$$

store the derived and measured idle processor power values as a set of idle_proc_pwr_char(T) values when determined prior to shipping and a set of idle_proc_pwr_shipped(T) values when determined after shipping.

12. The computer program product of claim 7, wherein the computer readable program to identify the dynamic power management mode power value for the processor in the computing device during the current interval further causes the computing device to:

determine a run-time fixed-frequency power estimation in a dynamic power saving mode.

13. An apparatus, comprising:

a first processor; and a memory coupled to the first processor, wherein the memory comprises instructions which, when executed by the first processor, cause the first processor to:

for each time interval in a plurality of time intervals within a time period:

identify a modeled total nominal power value for a second processor in the apparatus during a current time interval, wherein the instructions to identify the modeled total nominal power value for the second processor in the apparatus during the current time interval further causes the first processor to:

identify an aggregated activity estimate value for the second processor within the apparatus that indicates the power being used by the second processor in executing activities of a workload in the current time interval as detected by a power sensor associated with the second processor;

multiply the aggregated activity estimate value with a frequency scaling factor thereby producing a frequency-scaled activity proxy counter value that is indicative of the activities being executed by the second processor as a value of a specified fixed-frequency value;

utilizing vital processor data for the second processor, determine a power scaling factor for the second processor;

multiply the power scaling factor with the frequency-scaled activity proxy counter value in order to obtain a modeled active power value;

utilizing a current operating temperature of the apparatus as detected by a thermal sensor associated with the apparatus, identify a shipped temperature dependent idle power value for the second processor;

add the identified shipped temperature dependent idle processor power value to the modeled active power value to obtain a modeled process power value; and add the modeled processor power value for the second processor to at least one of: a measured fan power value for a fan in the apparatus for the current time interval as detected by a power sensor associated with the fan, a measured power value for a memory device in the apparatus as detected by a power sensor associated with the memory device, a measured power value for an input/output (I/O) device in the apparatus as detected by a power sensor associated with the I/O device, or a measured power value for a service processor in the apparatus as detected by a power sensor associated with the service processor in order to obtain the modeled total nominal power value for the second processor during the current time interval;

store the modeled total nominal power value for the current time interval in a storage, wherein, for the plurality of time intervals, the first processor stores a plurality of modeled total nominal power values;

identify a dynamic power management mode power value for the second processor in the apparatus during the current interval; and store the dynamic power management mode power value for the current time interval in the storage, wherein, for the plurality of time intervals, the first processor stores a plurality of dynamic power management mode power values; and responsive to the time period expiring, produce a comparison of the plurality of modeled total nominal power values and the plurality of dynamic power management mode power values over the time intervals in the plurality of time intervals in the time period.

14. The apparatus of claim 13, wherein the vital product data is provided either by a manufacturer or calculated at deployment time of the data processing system.

15. The apparatus of claim 13, wherein the instructions determines the aggregated activity estimate value by causing the first processor to:
- receive a set of activities to be monitored for one or more components of the second processor and an activity proxy threshold value for each of the one or more components;
- store a value for each activity of the set of activities in an assigned counter of a set of counters, forming a set of stored values;
- identify a weight factor specific to each activity;
- multiply each stored value for each activity to the identified weight factor that corresponds to the activity thereby producing a set of weighted values;
- sum the set of weighted values to form a total value for the set of activities; and
- add the total value to a constant factor in order to form the aggregated activity estimate value.

16. The apparatus of claim 13, wherein the instructions determine a power scaling factor for the second processor by causing the first processor to identify a slope_shipped value utilizing the following equation:

$$\text{Slope\_shipped} = ((\text{VPD\_pwr\_noml\_shipped} - \text{idle\_proc\_pwr\_shipped}(T))*\text{slope\_char}) / (\text{VPD\_pwr\_nom\_char} - \text{idle\_proc\_pwr\_char}(T))$$

wherein the idle_proc_pwr_char(T) value represents idle power utilized by the second processor under no workload prior to shipping, wherein the idle_proc_pwr_shipped(T) value represents idle power utilized by the second processor under no workload after shipping, wherein the VPD_pwr_nom_char value represents a nominal power characteristic of the second processor prior to shipping, wherein the VPD_pwr_noml_shipped value represents a nominal power of the second processor after shipment, and wherein the (slope_char) value represents a characteristic slope of the second processor.

17. The apparatus of claim 16, wherein the instructions determine the idle_proc_pwr_char(T) value, which is determined prior to shipping, and the idle_proc_pwr_shipped(T) value, which is determined after shipping by causing the first processor to:
- set a current thermal value T to a low end of a range;
- process a current workload on the second processor until a temperature associated with the second processor stabilizes as detected by a thermal sensor associated with the second processor;
- determine whether the temperature has stabilized by monitoring the ambient temperature of the apparatus via the thermal sensor associated with the apparatus;
- responsive to the temperature of the apparatus stabilizing, measure a first total processor power value $P_1$ associated with the second processor via the power sensor associated with the second processor;
- set the current thermal value T to a midpoint of the range;
- process the current workload on the second processor until the temperature associated with the second processor stabilizes as detected by the thermal sensor associated with the second processor;
- determine whether the temperature has stabilized by monitoring the ambient temperature of the apparatus via the thermal sensor associated with the apparatus;
- responsive to the temperature of the apparatus stabilizing, measure a second total processor power value $P_2$ associated with the second processor via the power sensor associated with the second processor;
- set the current thermal value T to a high end of the range;
- process the current workload on the second processor until the temperature associated with the second processor stabilizes as detected by the thermal sensor associated with the second processor;
- determine whether the temperature has stabilized by monitoring the ambient temperature of the apparatus via the thermal sensor associated with the apparatus;
- responsive to the temperature of the apparatus stabilizing, measure a third total processor power value $P_3$ associated with the second processor via the power sensor associated with the second processor;
- determine a cool idle power slope value (idle_pwr_slope_cool) and a hot idle power slope value (idle_pwr_slope_hot) using the following equations:

$$\text{idle\_pwr\_slope\_cool} = (P_2 - P_1)/(T_{thr2} - T_{thr1}), \text{ and}$$

$$\text{idle\_pwr\_slope\_hot} = (P_3 - P_2)/(T_{thr3} - T_{thr2});$$

- derive unknown idle processor power values utilizing an idle processor power (idle_proc_pwr(T)) model equation:
- for temperatures between low temperature and midpoint temperature:

$$\text{idle\_proc\_pwr}(T) = P_2 + (T_{des} - \text{midpoint temperature})*\text{idle\_pwr\_slope\_cool, and}$$

- for temperatures between midpoint temperature and high temperature:

$$\text{idle\_proc\_pwr}(T) = P_3 + (T_{des} - \text{high temperature})*\text{idle\_pwr\_slope\_hot; and}$$

- store the derived and measured idle processor power values as a set of idle_proc_pwr_char(T) values when determined prior to shipping and a set of idle_proc_pwr_shipped(T) values when determined after shipping.

18. The apparatus of claim 13, wherein the instructions identifying the dynamic power management mode power value for the second processor in the apparatus during the current interval by causing the first processor to:
- determine a run-time fixed-frequency power estimation in a dynamic power saving mode.

* * * * *